United States Patent [19]
Billström et al.

[11] Patent Number: 5,590,133
[45] Date of Patent: Dec. 31, 1996

[54] APPARATUSES AND MOBILE STATIONS FOR PROVIDING PACKET DATA COMMUNICATION IN DIGITAL TDMA CELLULAR SYSTEMS

[75] Inventors: Lars Billström, Sonla; Lars Wetterborg; Steinar Dahlin, both of Järfälla; Bengt Persson, Djursholm, all of Sweden

[73] Assignee: Telefonaktiebolaget LM Ericsson, Stockholm, Sweden

[21] Appl. No.: 354,874

[22] Filed: Dec. 9, 1994

[30] Foreign Application Priority Data

Dec. 10, 1993 [SE] Sweden ................................. 9304119

[51] Int. Cl.$^6$ ............................... H04T 3/26; H04Q 7/38
[52] U.S. Cl. ........................... 370/349; 379/60; 455/332; 370/332; 370/337; 370/338; 370/403
[58] Field of Search ................................. 370/94.1, 95.1, 370/95.3, 60, 110.1, 79; 379/58, 59–63; 455/331, 54.1, 56.1; 340/825.44

[56] References Cited

U.S. PATENT DOCUMENTS

| | | | |
|---|---|---|---|
| 4,887,265 | 12/1989 | Felix | 370/94.1 |
| 4,916,691 | 4/1990 | Goodman | 370/60 |
| 5,103,445 | 4/1992 | Ostlund | 455/54.1 |
| 5,195,090 | 3/1993 | Bolliger et al. | 370/94.1 |
| 5,305,308 | 4/1994 | English et al. | 370/94.1 |
| 5,371,780 | 12/1994 | Amitay | 370/94.1 |
| 5,384,826 | 1/1995 | Amitay | 370/94.1 |
| 5,396,543 | 3/1995 | Beeson, Jr. et al. | 370/94.1 |

FOREIGN PATENT DOCUMENTS

| | | |
|---|---|---|
| 2063901 | 9/1992 | Canada . |
| 544464 | 6/1993 | European Pat. Off. . |

OTHER PUBLICATIONS

K. Felix, "Packet Switching in Digital Cellular Systems", Pro. 38th IEEE Vehicular Technology Conf., pp. 414–418 (Jun. 1988).
"Cellular Digital Packet Data (CDPD) System Specification", vol. 1 System Overview, Release 1.0 (Jul. 19, 1993).
P. Decker, "Packet Radio in GSM", Tech.Doc. SMG 4 58/93, European Telecommunications Standards Institute (ETSI) (Feb. 12, 1993).
P. Decker et al., "A General Packet Radio Service Proposed for GSM", Aachen University of Technology (Oct. 13, 1993).
J. Hämäläinen et al., "Packet Data over GSM Network", Tech. Doc. SMG 1 238/93, ETSI (Sep. 28, 1993).
CME 20 System Survey Doc. No. EN/LZT 120 226 R4B, Chapter 3, pp. 17–28; Chapter 5, pp. 57–68; and Chapter 9, pp. 121–148, Ericsson Radio Systems AB (1991, 1992, 1994).

Primary Examiner—Benedict V. Safourek
Assistant Examiner—Seema S. Rao
Attorney, Agent, or Firm—Burns, Doane, Swecker & Mathis, L.L.P.

[57] ABSTRACT

Apparatuses and mobile stations are described which provide packet data services in TDMA (Time Division Multiple Access) cellular systems, based on providing shared packet data channels optimized for packet data. A first "integrated" embodiment utilizes the current cellular infrastructure to the extent possible consistent with functional and performance requirements. Shared packet data channels in base stations may be provided dynamically determined by demand. A packet data controller in each Mobile services Switching Center controls access to the packet data services. A packet data router in each MSC routes packets to and from the MSC service area. A backbone network interconnects packet data routers and Interworking Functions providing internetworking with external network(s). A second "separate" embodiment, in order to minimize the impact on the current cellular system, primarily utilizes the base station portion of the cellular system, relying for the remaining network parts on a separate mobile packet data infrastructure.

57 Claims, 20 Drawing Sheets

SEQUENCE DIAGRAM: MOBILE ORIGINATED PD STATE ESTABLISHMENT

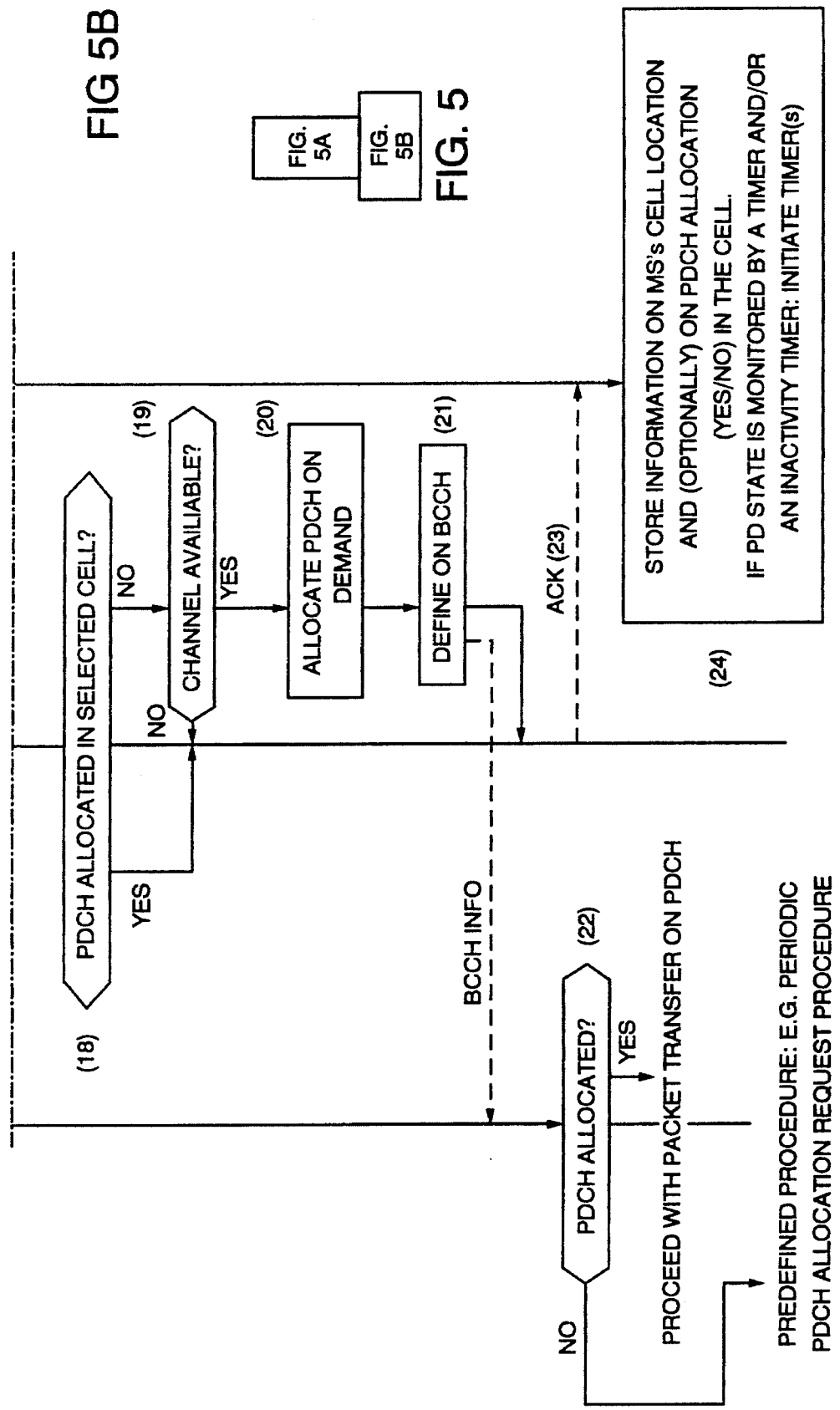

DOWNLINK MULTIFRAMES

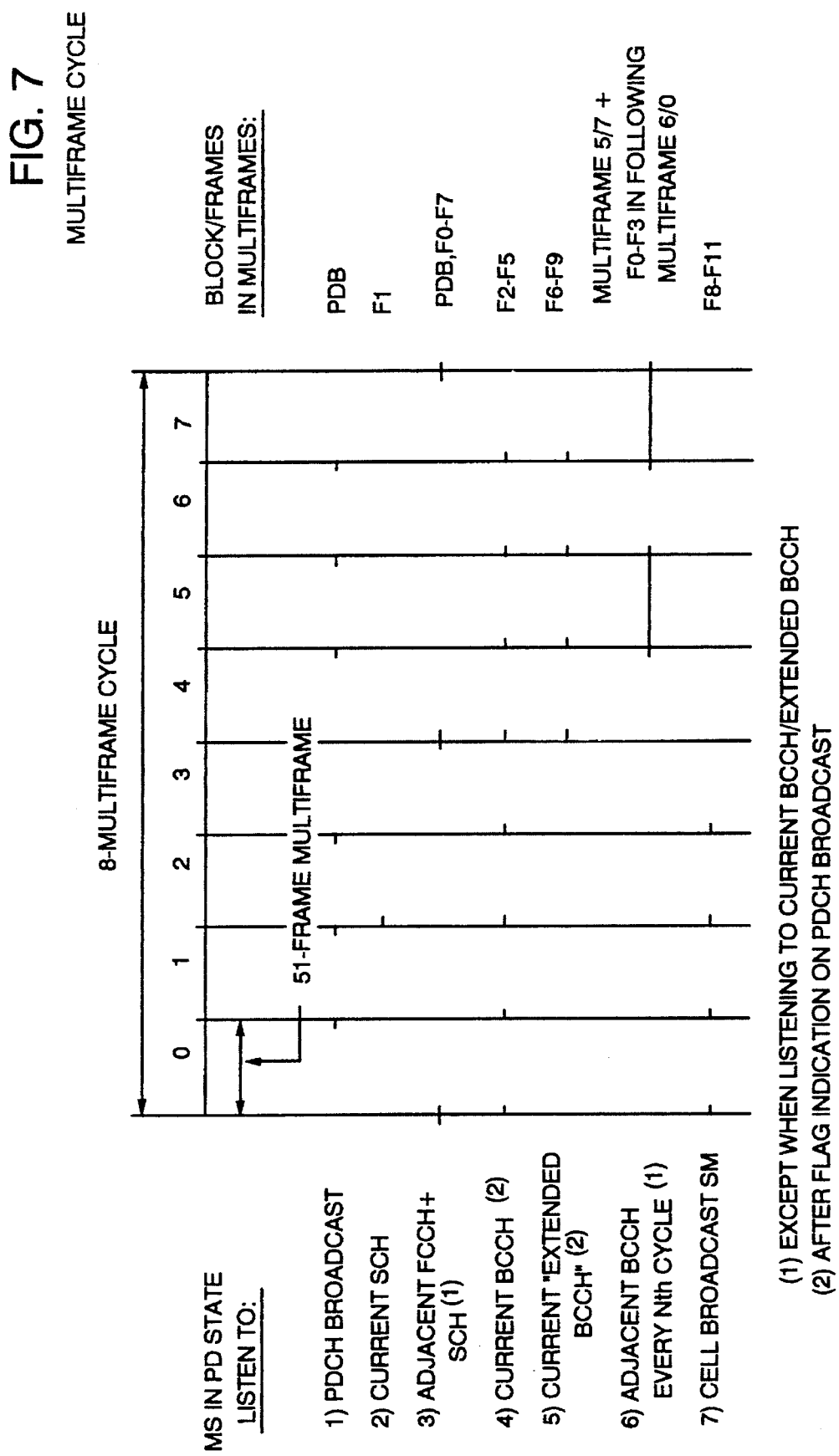

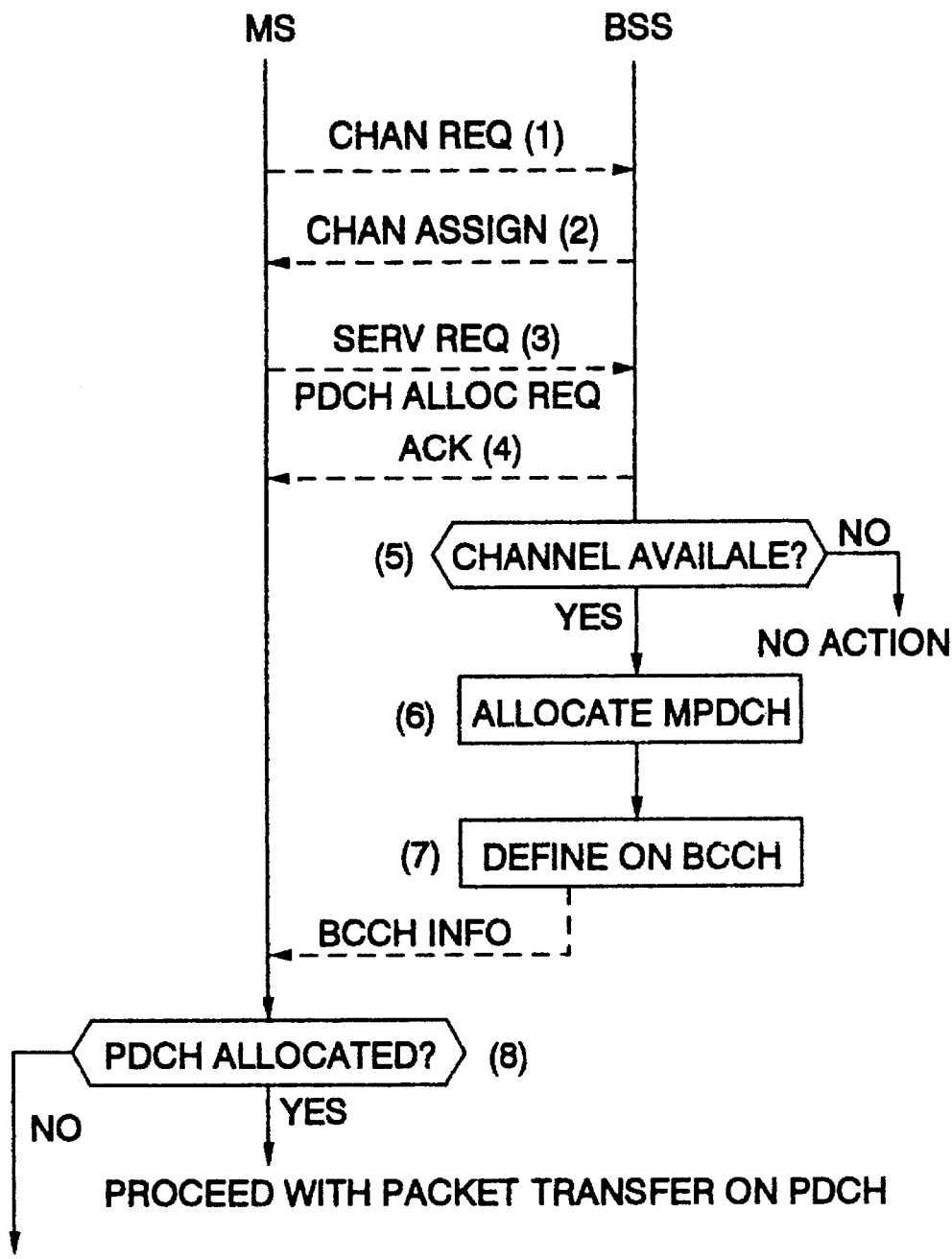

FLOW CHART: DYNAMIC ALLOCATION OF PDCHS

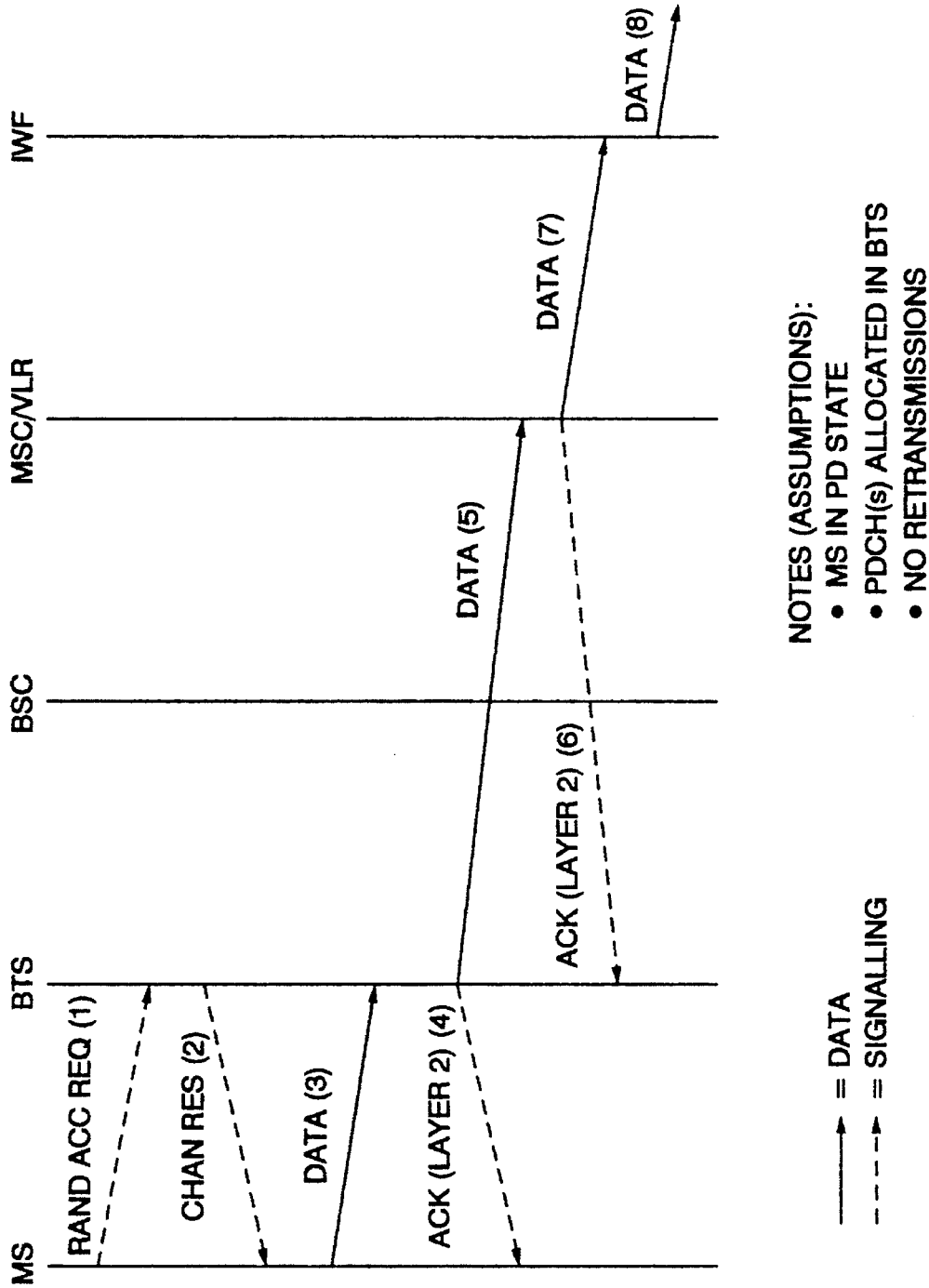

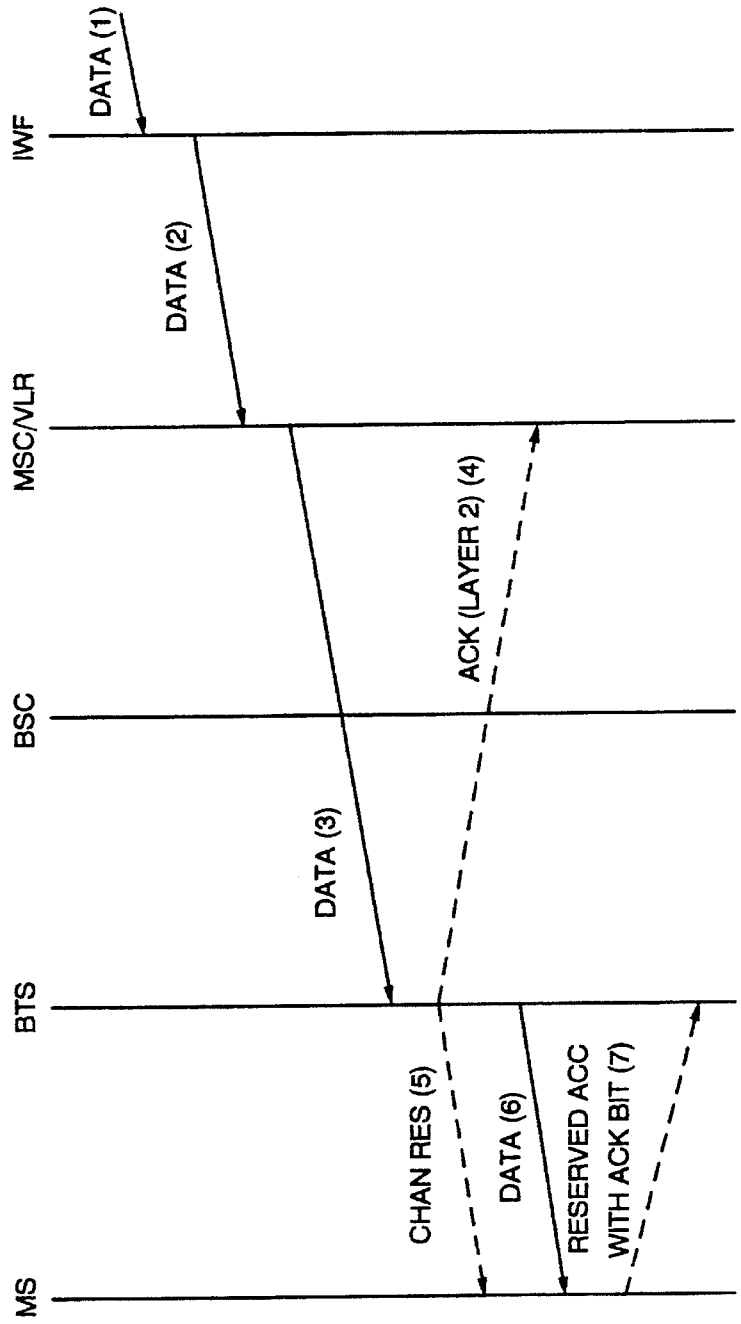

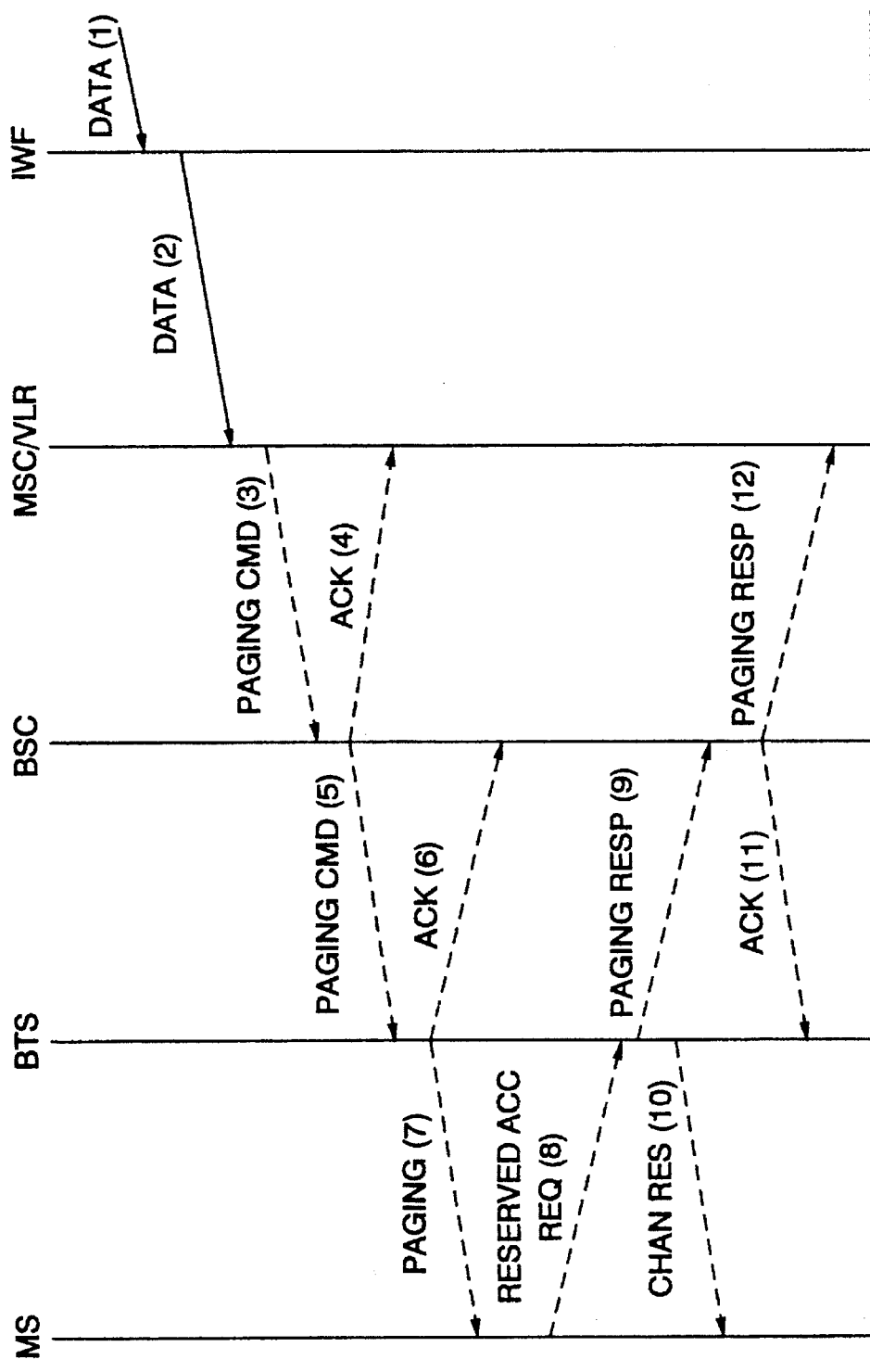

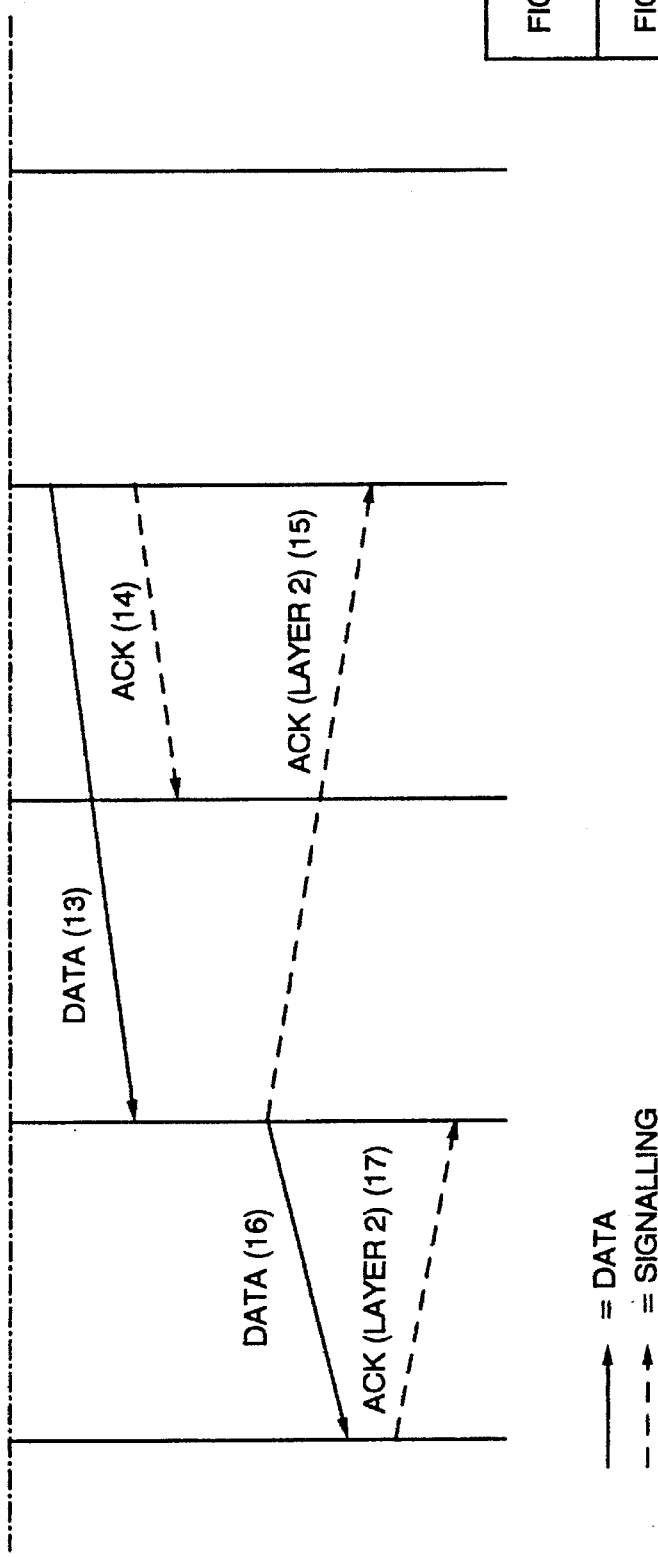

MPDCH - PACKET TRANSFER EXAMPLES

ROUTING EXAMPLE - FIRST ADDRESSING SCHEME

APPARATUSES AND MOBILE STATIONS FOR PROVIDING PACKET DATA COMMUNICATION IN DIGITAL TDMA CELLULAR SYSTEMS

BACKGROUND

This invention relates to digital TDMA (Time Division Multiple Access) cellular radio mobile telecommunications systems. More specifically, the present invention is directed towards apparatuses and mobile stations for providing packet data communications services in current TDMA cellular systems.

Mobile data communication is rapidly becoming one of the fastest growing segments of the mobile communications market. Independent market studies predict several million users in Europe by the year 2000. A strong driving force is the fast growing portable personal ("laptop", "palmtop" and "notebook") computer market and the need for flexible wireless data communications it creates. This market force is further emphasized by the emerging new communication-centered devices, commonly referred to as "Personal Digital Assistants" or "Personal Communicators". Target applications include:

The wide range of standard business applications today predominantly used across fixed data networks, such as electronic mail and host computer/data base access.

Specialized mobile data applications including vehicle fleet control and road transport informatics.

Fixed wireless applications, including remote monitoring and control applications, and credit card verification and similar financial transaction applications.

Possible new applications as a result of the convergence of the two enabling technologies of new personal computing/communicating devices and efficient and widely available mobile data communications.

To support this variety of applications in a cost effective manner, a mobile data network should:

Provide packet mode data services based on shared packet data radio channels optimized for packet data (exploiting the bursty nature of most data communications applications) to achieve spectrum efficiency and cost effectiveness.

Provide industry standard network services, including standard connectionless network (datagram) services and, depending on market requirements, standard connection-oriented network (virtual call) services e.g. to provide transparent X.25 connectivity.

Provide performance (packet transfer delays) comparable to what is provided by current fixed networks, to allow existing standard applications to be used without modification.

Provide broadcast and multicast services to support specialized mobile applications.

Providing the packet data services on a cellular system platform offers potential advantages in terms of widespread availability, possibility of combined voice/data services, and comparatively low additional investments by capitalizing on the cellular infrastructure. Of particular interest are current TDMA cellular systems, through their spectrum efficiency and world wide penetration. Examples of potential TDMA platforms include:

GSM (Global System for Mobile communication)

Systems with a GSM type of architecture but operating in other frequency bands, such as the 1800 and 1900 MHz bands, including PCN (Personal Communications Network) in Europe and PCS (Personal Communications Services) in the U.S.A.

The North American D-AMPS (Digital Advanced Mobile Phone Service) system.

The Japanese PDC (Personal Digital Cellular) system.

However, the data services provided by or proposed for cellular systems in general are with few exceptions based on circuit mode of operation, using a dedicated radio channel for each active mobile user. The exceptions include the packet data concepts described in the following documents:

a) U.S. Pat. No. 4,887,265 and Proc. 38th IEEE Vehicular Technology Conference, June 88, Philadelphia (U.S.), pages 414–418: "Packet Switching in Digital Cellular Systems".

These documents describe a cellular system providing shared packet data radio channels, each one capable of accomodating multiple data calls. A mobile station requesting packet data service is assigned to a particular packet data channel using essentially regular cellular signalling. The system may include Packet Access Points (PAPs) for interfacing with packet data networks. In that case, each packet data radio channel is connected to one particular PAP and is thus capable of multiplexing data calls associated with that PAP. System initiated handover (handoff) is employed, to a large extent similar to the type of handover used in the same system for voice calls. A new type of handover is added for handling situations when the capacity of a packet channel is insufficient.

b) U.S. Pat. No. 4,916,691.

This document describes (for one of the embodiments) a new packet mode cellular radio system architecture, and a new procedure for routing (voice and/or data) packets to a mobile station. Base stations, public switches via trunk interface units, and a cellular control unit are linked together via a wide area network. The routing procedure is based on mobile station initiated handover and on adding to the header of any packet transmitted from a mobile station (during a call) an identifier of the base station through which the packet passes. In case of an extended period of time between subsequent user information packets from a mobile station, the mobile station may transmit extra control packets for the sole purpose of conveying cell location information. The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

c) Cellular Digital Packet Data (CDPD) System Specification, Release 1.0, July, 1993.

CDPD is a new concept for providing packet data services, utilizing available radio channels on current Advanced Mobile Phone Service AMPS systems (i.e. the North American Analog Cellular System). CDPD is a comprehensive, open specification endorsed by a group of U.S. cellular operators. Items covered include external interfaces, air interfaces, services, network architecture, network management, and administration. The CDPD system specified is to a large extent based on an independent infrastructure. Common denominators with AMPS systems are limited to utilization of the same type of radio frequency channels and the same base station sites (the base station itself, used by CDPD, is new and CDPD specific), and employment of a signalling interface for coordinating channel assignments between the two systems. Routing a packet to a mobile station is based on, first routing the packet to a home network node (home Mobile Data Intermediate System, MD-IS) equipped with a home location register (HLR), based on the mobile station address; then, when necessary, routing the packet to a visited, serving MD-IS based on HLR information; and finally transferring the packet from the serving MD-IS via the current base station, based on the mobile station reporting its cell location to its serving MD-IS.

d) ETSI (European Telecommunications Standards Institute) T Doc SMG 4 58/93, Feb. 12, 1993: "Packet Radio in GSM"; and "GSM in a future competitive environment", seminar, Helsinki, Oct. 13, 1993: "A General Packet Radio Service Proposed for GSM".

These documents outline a possible packet access protocol for voice and data in GSM.

e) ETSI T Doc SMG 1 238/93, Sep. 28, 1993: "Packet Data over GSM Network".

This document describes a concept of providing packet data services in GSM based on first using regular GSM signalling and authentication to establish a virtual channel between a packet mobile station and an "Agent", handling access to packet data services. With regular signalling modified for fast channel setup and release, regular traffic channels are then used for packet transfer.

Of the above documents, documents d) and e) directly relate to a TDMA cellular system. Documents d), although outlining a possible organisation of an optimized shared packet data channel, do not deal with the aspects of integrating packet data channels in a total system solution.

The concept described in document e), being based on using a "fast switching" version of existing GSM traffic channel, has disadvantages in terms of spectrum efficiency and packet transfer delays (especially for short messages) compared to a concept based on optimized shared packet data channels.

The system described in documents a) is data call oriented and based on using system initiated handover in a similar way as for regular voice calls. Applying these principles for providing general purpose packet data services in a TDMA cellular system would imply spectrum efficiency and performance disadvantages. For example, system initiated handover in GSM is based on allocating 1/26 of a traffic channel capacity during a call for signalling related to monitoring and controlling signal quality (for a single mobile station) in preparation for a possible handover.

The systems described in documents b) and c) are not directly related to the specific problems of providing packet data services in TDMA cellular systems.

To summarize, there is a need for a system concept for providing general purpose packet data services in TDMA cellular systems, based on providing shared packet data channels optimized for packet data.

SUMMARY

The overall object of the present invention is to provide system concepts for providing general purpose packet data communication services in current digital TDMA cellular systems, based on providing spectrum efficient shared packet data channels optimized for packet data and compatible with cellular requirements. Target systems include GSM systems, systems based on GSM architecture but operating in other frequency bands (e.g. the 1800 and 1900 MHz bands), D-AMPS and PDC systems.

Specifically, an object of the invention is to provide an "integrated" system concept that provides the new packet data services in a closely integrated way, utilizing the current TDMA cellular infrastructure to the extent possible consistent with packet data functional and performance requirements.

It is another object of the invention to provide a mobile station for packet data communication over TDMA cellular shared packet data channels enabled by the integrated system concept.

Another object of the invention is to provide a "separated" system concept that provides the new packet data services with minimum impact on the current TDMA cellular infrastructure, by primarily utilizing the base station portion of the cellular system and for the remaining network parts relying on a separate mobile packet data infrastructure. As the base station portion (including sites) constitutes a major part of a cellular system investment, the advantage of capitalizing on the cellular infrastructure applies also for this system concept. The remaining separate infrastructure may be based on available mobile packet data network technology.

It is yet another object of the invention to provide a mobile station for packet data communication over TDMA cellular shared packet data channels enabled by the separated system concept.

These objectives are attained by apparatuses and mobile stations as described below.

For example, Applicants' invention provides an apparatus for providing packet data communication to and from mobile stations in a digital TDMA cellular system having a plurality of base stations providing regular cellular control channels; one or more mobile services switching centers, each being associated with a visitor location register and being coupled to a subordinated plurality of the base stations; and home location register means for storing information on subscribers. The apparatus comprises a channel providing device for providing, in at least some of the base stations, on a per cell basis, one or more shared packet data channels for packet transfer to and from the mobile stations, and a packet transfer controlling device for controlling the packet transfer.

The apparatus further comprises a channel defining device for defining, on a per cell basis, the packet data channel to be used for initiating packet transfer; a first packet data mode establishing device for establishing packet data mode for a mobile station to enable the mobile station to send and receive packets over the packet data channels; and a first packet transferring device for transferring packets between the mobile stations and a base station; a second packet transferring device for transferring packets between the base stations and their respective superior mobile services switching centers.

The apparatus further comprises a packet routing device for routing packets to and from a service area of a mobile services switching center; a first device for performing cell selection for a mobile station in packet data mode; a first device for performing location updating for the mobile station in packet data mode; a first packet data mode maintaining device for maintaining the packet data mode for a roaming mobile station; and a first packet data mode terminating device for terminating the established packet data mode for the mobile station.

Applicants' invention also provides a mobile station for packet data communication over digital TDMA cellular shared packet data channels provided by the apparatus described above. The mobile station comprises a channel identifying device for identifying, on a per cell basis, the packet data channel to be used for initiating packet transfer; a second packet data mode establishing device for establishing packet data mode for the mobile station to enable it to send and receive packets over the packet data channels; a device for sending and receiving packets over the packet data channels; a second device for performing cell selection in packet data mode; a second device for performing location updating in packet data mode; a second packet data mode maintaining device for maintaining the packet data mode for the mobile station; and a second packet data mode terminating device for terminating the established packet data mode for the mobile station.

BRIEF DESCRIPTION OF THE DRAWINGS

FIGS. 5, 5A, and 5B show a sequence diagram illustrating establishment of PD state (PD mode), initiated from a mobile station (MS).

FIG. 7 shows an example of a multiframe cycle formed by 8 MPDCH downlink multiframes (illustrated in FIG. 6), and an example of scheduling adequate times for listening to regular GSM broadcast channels.

FIG. 8 shows a sequence diagram illustrating allocation of a packet data channel (PDCH) on demand, initiated from an MS (applicable to embodiment I).

FIG. 10 shows a sequence diagram illustrating an example of a mobile originated packet transfer in Embodiment I.

FIG. 11 shows a sequence diagram illustrating an example of a mobile terminated packet transfer (using "immediate channel reservation") in Embodiment I.

FIGS. 12, 12A, and 12B show a sequence diagram illustrating an example of a mobile terminated packet transfer (using paging) in Embodiment I.

DETAILED DESCRIPTION

Two different embodiments of the invention are described, both applied to a digital TDMA cellular system with a GSM type of architecture. Although this type of system may operate in another frequency band (such as the 1800 or 1900 MHz band) than that specified for GSM, it is in the following description referred to as a "GSM system". One of the embodiments (Embodiment 1) is directed towards providing the new packet data services in a closely integrated way, utilizing the current infrastructure to the extent possible, consistent with functional and performance requirements. By contrast, the second embodiment (Embodiment 2), in order to minimize the impact on the current system, primarily utilizes the base station portion of the GSM system, for the remaining network parts relying on a separate mobile packet data infrastructure.

The description focuses on the new packet data functions introduced. Descriptions of the GSM system as implemented by Ericsson may be found in Ericsson Review No. 3, 1991 and in "CME 20 Training Document" with the Ericsson designation EN/LZT 120 226 R3A.

I. EMBODIMENT 1

I.A Overview

Figure 1:
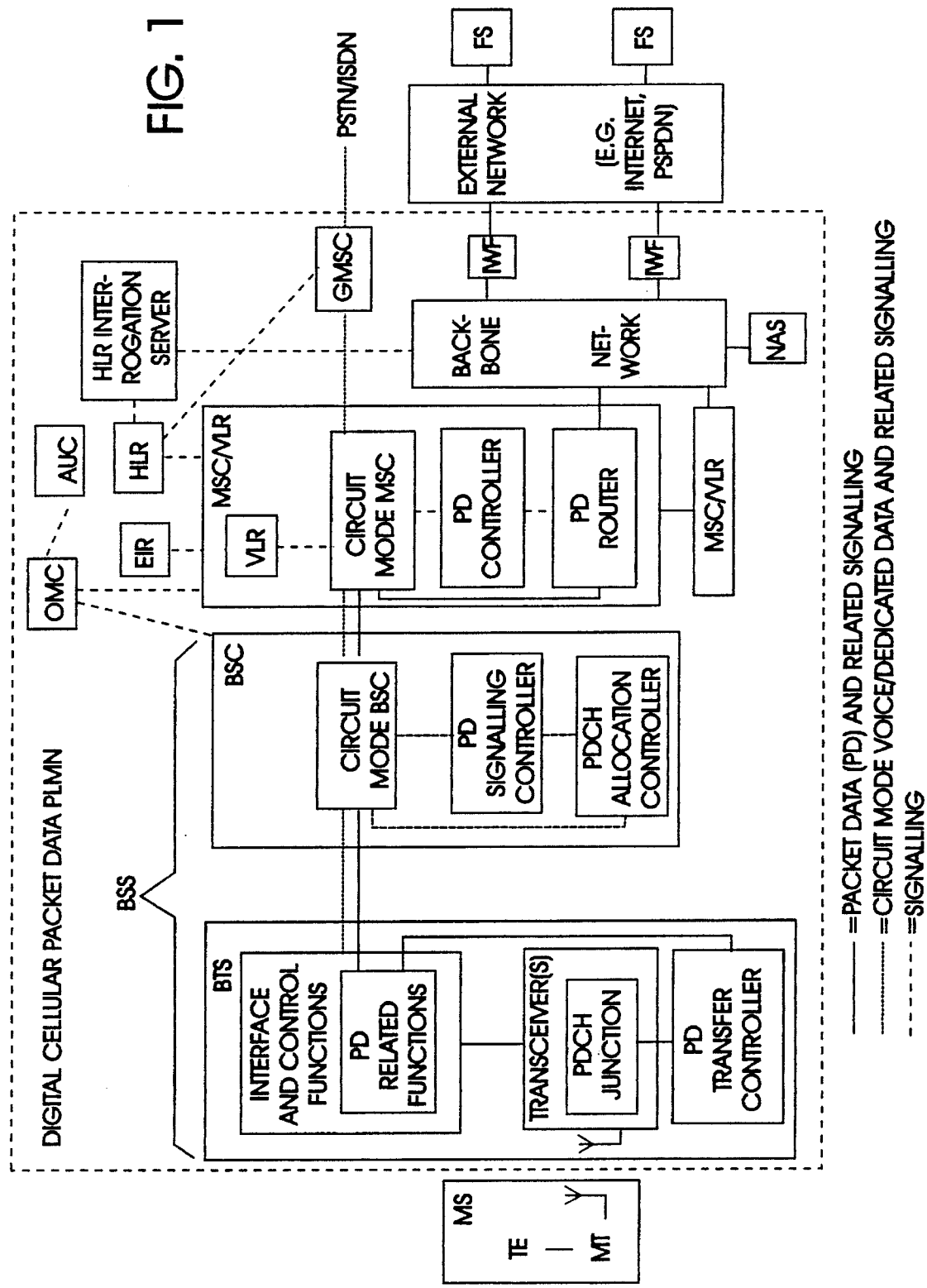
FIG. 1 illustrates an embodiment of the "integrated" system concept applied to a GSM system ("Embodiment I"), by showing a block diagram of a GSM system enhanced with packet data (PD) functions, the major PD function blocks shown with bold contour lines.

FIG. 1 illustrates a GSM system enhanced with packet data (PD) functions, the major PD function blocks shown with bold contour lines. A plurality of Base Transceiver Stations (BTSs), each providing radio communication service to multiple Mobile Stations (MSs) in one cell, together provide complete coverage of the GSM Public Land Mobile Network (PLMN) service area. Only one BTS and one MS are shown schematically in the figure. It comprises a Mobile Termination (MT) and a Terminal Equipment (TE) part. A group of BTSs is controlled by a Base Station Controller (BSC), and these together form a Base Station System (BSS). One or more BSSs are served by a Mobile services Switching Centre (MSC) with an associated Visitor Location Register (VLR). An MSC controls calls to and from other networks such as PSTN (Public Switched Telephone Network), ISDN (Integrated Services Digital Network), or other PLMN networks. An MSC equipped for routing incoming calls is referred to as a Gateway MSC (GMSC). One or more MSC service areas together constitute the PLMN service area. Furthermore, the MSC/VLR(s) are via a CCITT (International Telegraph & Telephone Consultative Committee) Common Channel Signalling (CCS) system No. 7 network connected to a Home Location Register (HLR), which is a data base comprising information on all subscribers, including location information identifying the MSC/VLR where a subscriber is currently (or was last) registered. Connected to HLR, is an Authentication Centre (AUC), that provides HLR with authentication parameters. To allow identification of subscriber equipment, an Equipment Identity Register (EIR) is provided, connected to the MSC(s). Finally, an Operations and Maintenance Centre (OMC) may be included for providing overall network support.

The packet data functionality added in BTS includes capability to provide one or more shared packet data channels (here referred to as "PDCHs"), depending on demand. In a cell, only occasionally visited by a packet data user, a PDCH may be allocated temporarily on user demand. In a cell with continuous packet data traffic demand on the other hand, one or more PDCHs may either be allocated on a semi-permanent basis, or be allocated dynamically, adapted to the current load situation. The allocation of PDCHs is controlled from BSC. The degree of PDCH support in a cell (continuous, on user demand, or no support at all) may be configurable. Information defining the support level and any PDCH, allocated for initiating packet transfer, is broadcasted on a regular GSM Broadcast Control Channel (BCCH). A PDCH is a new type of logical channel on a physical TDMA channel (time slot), optimized for shared packet transfer to and from multiple packet data capable MSs (supporting packet data only, or packet data combined with ordinary voice/circuit data services in different modes of operation). PDCHs are used for data transfer and associated control signalling. A "reservation-Aloha" type of protocol is employed. Uplinks and downlinks are basically used as independent channel resources. In a certain TDMA frame, a PDCH uplink may carry data from one MS and the downlink data to another. The packet data radio link protocol over the PDCH(s) allocated in a cell is handled by a "PD transfer controller" in BTS. In a BTS with at least one PDCH allocated, the PD transfer controller has a, normally unique, physical connection for packet transfer to and from MSC, utilizing ordinary internode trunks.

In MSC/VLR, a "PD router" is provided for routing packets to and from the MSC service area. Furthermore, a "PD controller" is provided for handling signalling exchange with the "circuit mode MSC", and for handling control, monitoring and parameter storage functions related to packet data MSs. The PD controller comprises processor, memory, signalling interface functions, and software. (Note: Although the PD router and PD controller are described as being provided in MSC/VLR, it should be understood that they, wholly or partly, physically could be realized in the form of external equipment attached to MSC.)

MSCs (PD routers) are interconnected via a backbone network to which also one or more interworking functions (IWFs) are connected. IWFs provide internetworking with external network(s), such as Internet (i.e. IP network) and/or PSPDN (Packet Switched Public Data Network, i.e. X.25 network), thus interconnecting Fixed Stations (FSs) with the MSs. An IWF may perform protocol conversion and address translation, as required. It may also route packet data traffic between cooperating PLMNs. Packet data traffic between MSs in different MSC service areas in the same PLMN is normally routed directly between the respective MSCs, across the backbone network. For routing purposes, HLR may, via a "HLR interrogation server", be interrogated from entities on the backbone network. The HLR interrogation server provides necessary functions to enable such interrogation from the packet data network. HLR, AUC, EIR and OMC, are also enhanced to support the new types of subscriptions, services and equipments.

Figure 2:
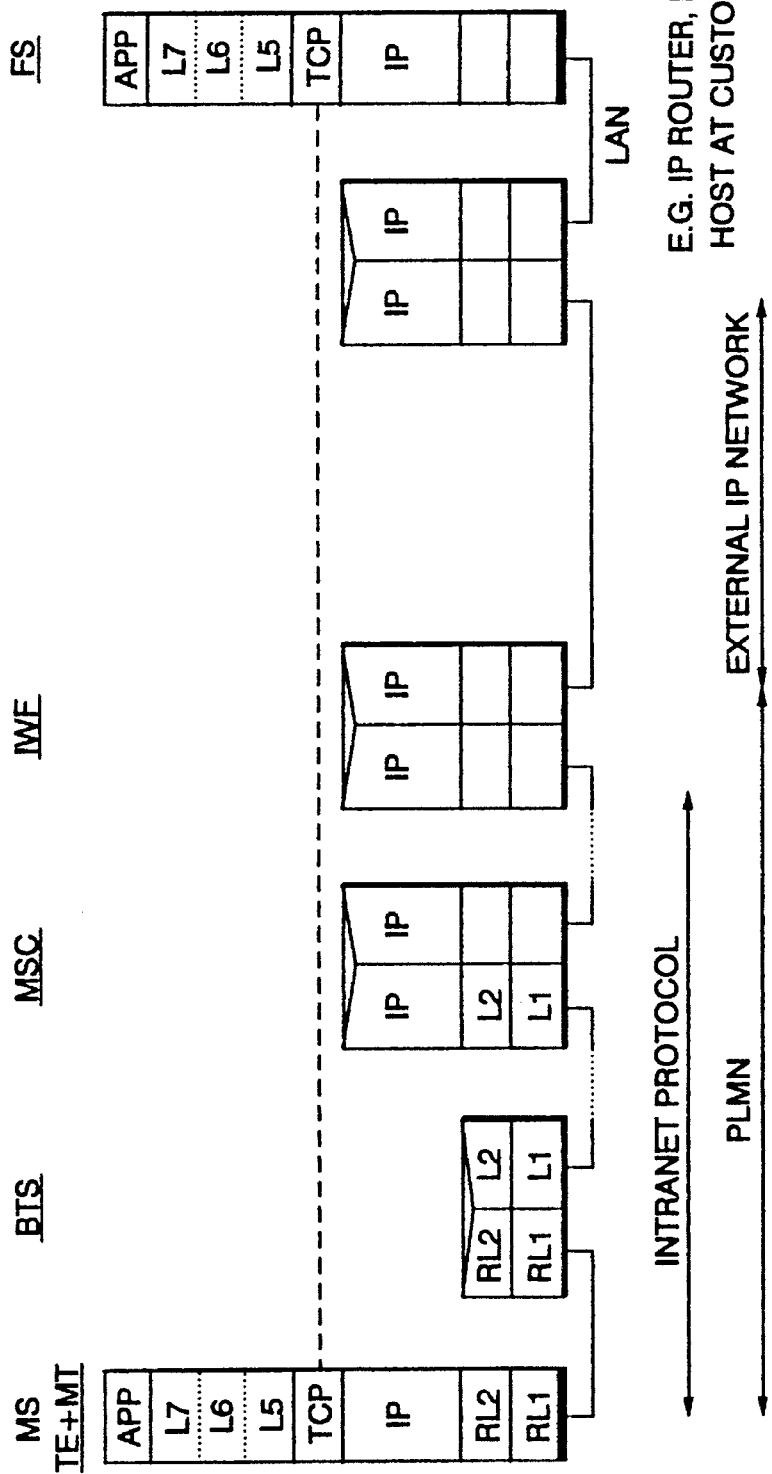
FIG. 2 illustrates an intranetwork protocol and interworking example (Internet Protocol IP) for Embodiment I.

The basic packet data network service provided is a standard connectionless network (datagram) service based on a standard connectionless IP protocol. IP is here used to denote the Internet Protocol (the de facto standard IP protocol used in the TCP/IP protocol suite) or the ISO (International Standards Organisation) Internetwork protocol (ISO 8473). (Possibly both these protocols may be supported.) Value-added services, including multicast, broadcast and electronic mail services, may be provided by Network Application Server(s) (NAS(s)), attached to the backbone network and accessed by using higher layer protocols on top of IP. Thus, from a packet data communication point of view, the PLMN basically appears as an IP network. The protocol architecture is illustrated in FIG. 2. The figure shows an example of communication between an MS and a fixed station (FS), e.g. a host computer, attached to an external IP network. IWF and MSC then both have the role of IP (layer 3) routers, and MS and FS may communicate end-to-end using a TCP (Transmission Control Protocol) transport (layer 4) protocol. The MT and TE parts of the MS are in this example integrated in one unit. Between MSC and MS, BTS acts as a link layer (layer 2) relay between the radio link protocol (denoted RL2 in the figure) and the link protocol (denoted L2) used across the trunk connection. The radio protocol handled by BTS is an ARQ (Automatic Repeat request) type of protocol, based on dividing each frame in equal size blocks and retransmitting blocks in error. In contrast to ordinary GSM, encryption/decryption is performed between MT and MSC. An MS is identified, on layer 3 with an IP address, and on layer 2 with standard GSM identities, International Mobile Subscriber Identity (IMSI) or, normally, Temporary Mobile Subscriber Identity (TMSI).

Figure 3:
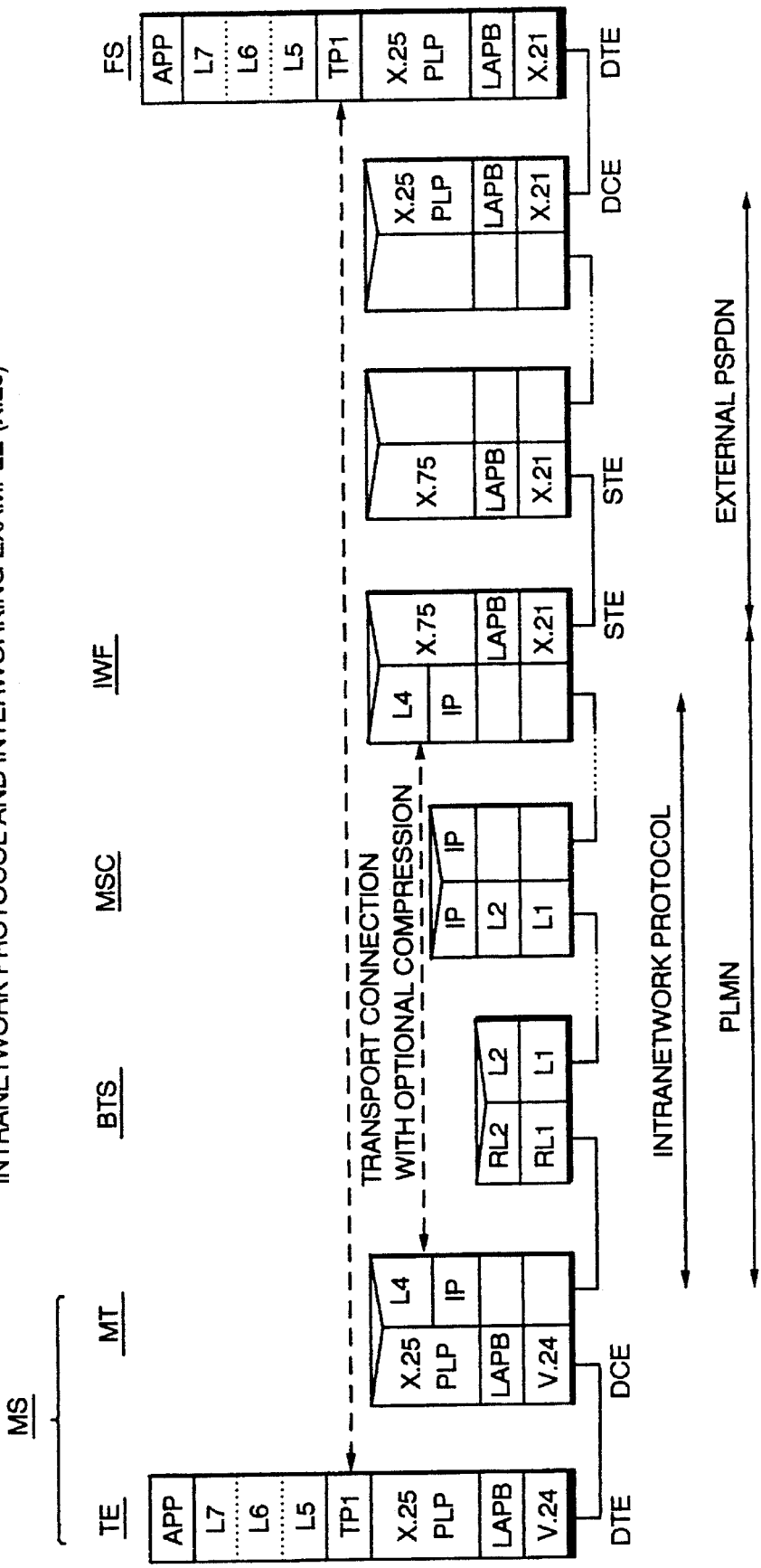
FIG. 3 illustrates an intranetwork protocol and interworking example (X.25) for Embodiment I.

Standard connect ion-oriented network (X.25) services may also be provided by employing a connection-oriented transport protocol across the PLMN, on top of the IP protocol. An example of transparent X.25 communication between an MS and an FS, attached to an external X.25 network, is shown in FIG. 3. In this example, an X.25 DCE-DTE interface is provided between MT and TE. IWF and MT both perform protocol conversion and map any X.25 virtual circuit on to a transport connection between the two entities, using the intra-PLMN transport protocol (denoted L4). IWF and MT also translate between X.121 and IP address. The L4 protocol may be utilized to provide optional data compression. When a transport connection is established between an MS and IWF, this transport connection is then maintained for the duration of the X.25 virtual call, even if the MS moves to the service area of another MSC. For packets in the mobile originated direction, this is achieved by, as part of the connection establishment procedure, informing the MT of the IP address of the IWF. MT then addresses all packets associated with this connection to this IWF. MSC, in its turn, merely routes packets based on their IP address. In the mobile terminated direction, the IWF is updated with new routing information when the MS moves to a new MSC, as described below. As indicated in the figure, TE and FS may communicate end-to-end via a transport protocol (such as ISO transport protocol Class 1).

The packet data services subscribed to are available to an MS after a procedure that brings the MS from an initial GSM idle mode to a new "PD mode". This procedure may be initiated either by the MS making a request for packet data service or by the MSC, currently serving the MS, receiving a packet addressed to the MS. The procedure is based on standard GSM signalling and utilizes standard GSM authentication. The PD mode establishment procedure also includes initiating parameters for packet encryption/decryption in the MS and its current MSC/VLR. After completed procedure, the MS is registered in its current MSC/VLR as being in PD mode. The system then provides access to PDCHs in any cell. It also provides other system mechanisms for fast packet transfer, including:

Maintaining the authentication granted at PD mode establishment, thus avoiding a time-consuming authentication procedure for normal packet transfers.

For mobile terminated traffic, mechanisms for establishing and maintaining routes from entities on the backbone network to the MS's current MSC, limiting the need for HLR interrogation to the initial route establishment.

In PD mode, an MS performs cell selection and location updating based on GSM idle mode procedures. (Handover, in the GSM sense, is not used.) When roaming between cells, the MS, from information broadcasted on BCCH, identifies the PDCH that may be used for intiating packet transfer in a cell. Initiation of packet transfer to an MS from its currently serving MSC is guided by monitoring the MS's cell location based on any previous packet transfer. Depending on the recentness of the cell location information, and on other MS operational parameters (e.g. mobile or stationary mode of operation), the packet transfer may be initiated with or without paging.

When an MS moves to a location area belonging to a new MSC/VLR, the PD mode registration and any associated information stored at the MS's currently serving MSC/VLR is transferred from the old to the new MSC/VLR. Peer entities of any routes established to the MS's current MSC are also updated with routing information to the new MSC.

I.B Packet Data Mode (PD Mode) and Mobility Management

Figure 4:
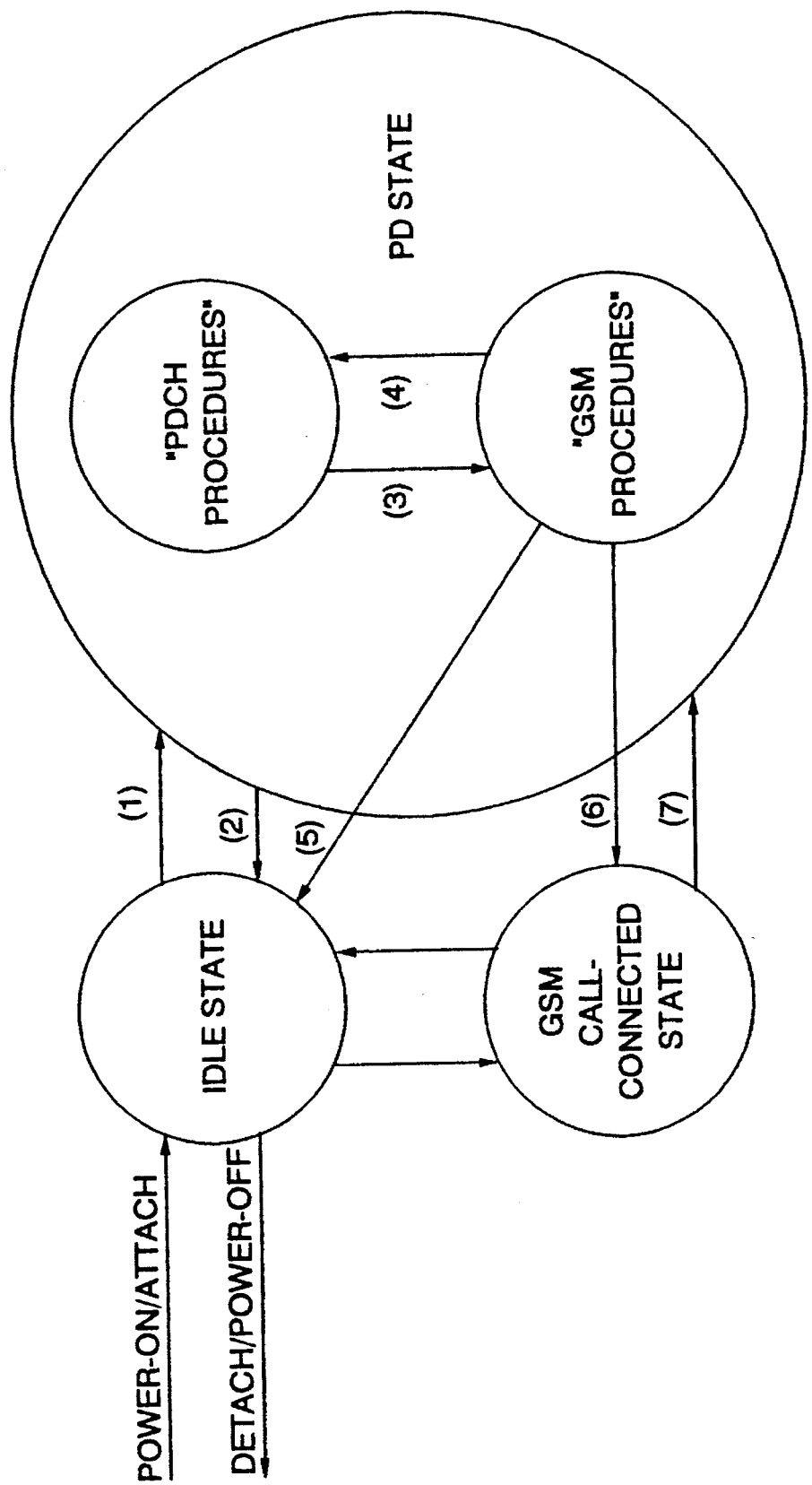
FIG. 4 illustrates a new PD state (PD mode), introduced in Embodiment I, in relation to regular GSM idle state (mode) and call-connected state (mode).

PD Mode in relation to regular GSM idle mode and call-connected mode is illustrated in FIG. 4. In this and other figures, the denomination "state" is used as a synonym for "mode". When a packet data MS is turned on, standard GSM power-on and registration procedures are used. After registration, the MS is in attached, idle mode and performs idle mode cell selection and location updating. In order to stay attached to the system, the MS also regularly initiates periodic registration.

Figure 5A:
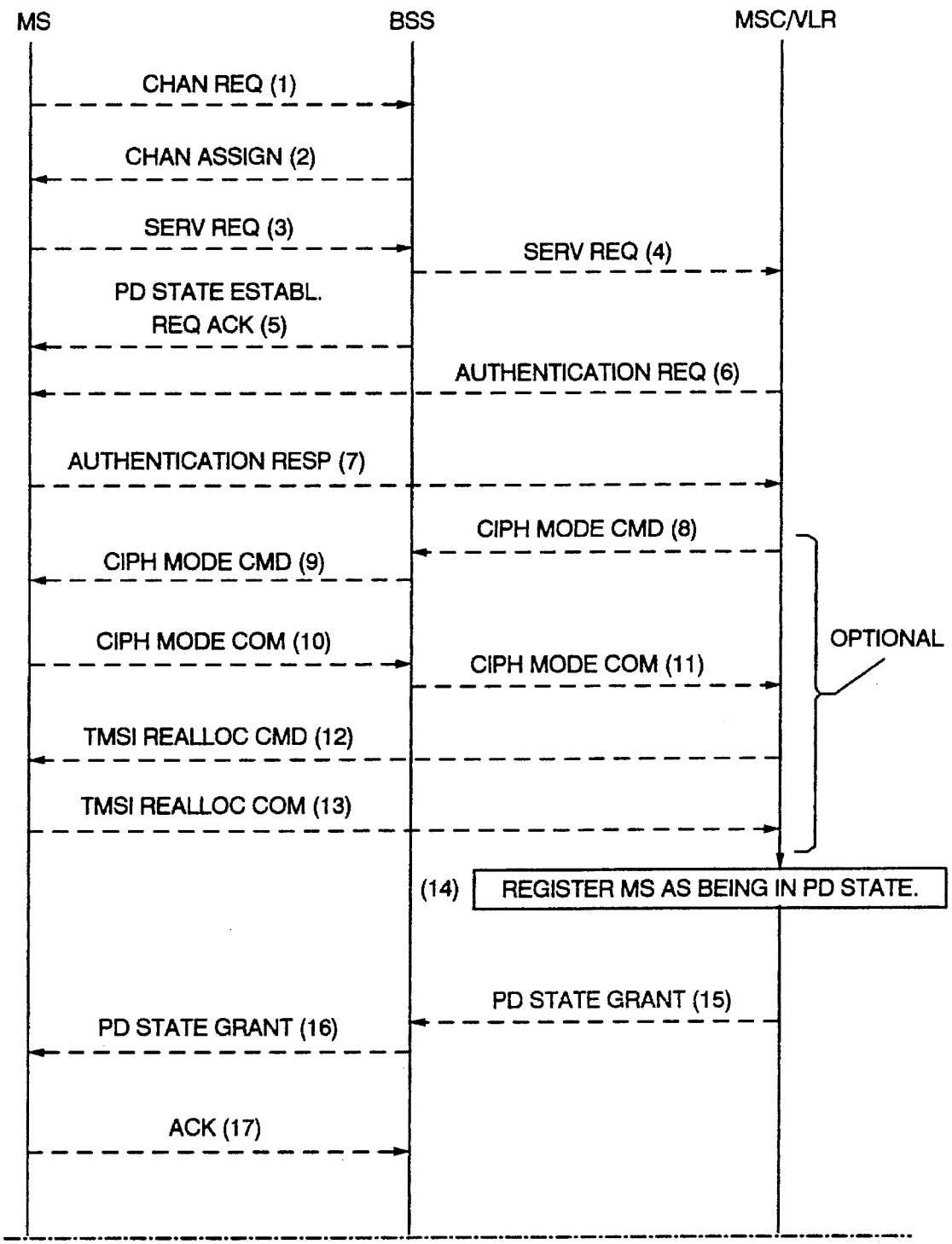

An MS in idle mode may change to PD mode (transition (1) in FIG. 4) by a procedure based on regular GSM signalling and authentication. The procedure may be initiated either by the MS, or by the MSC, currently serving the MS, receiving a packet addressed to the MS. The procedure in the former case is exemplified by the sequence diagram in FIG. 5. Initiation of the procedure may, as determined by a system parameter, be allowed only in cells where a PDCH is allocated or is allocatable on user demand. The signalling sequence (1)–(13) in the figure is based on standard GSM signalling and authentication procedures used for setting up regular GSM voice/circuit data calls. A new type of service request (signal (3)) is used to request PD mode establishment. The optional sequence (8)–(13) is employed to allocate the MS a TMSI (Temporary Mobile Subscriber Identity) and/or to initiate packet encryption/decryption parameters in the MS and its current MSC. After successful completion of the signalling sequence (1)–(13), the MS is registered in its current MSC/VLR as being in PD mode and (optional) encryption parameters are stored (block (14)). The sequence (15)–(17), also based on regular GSM signalling, confirms the PD mode registration and makes the MS change to PD mode. If a PDCH is not already allocated in the cell in question, the PDCH allocation controller in BSC (FIG. 1) attempts to allocate a PDCH on demand (blocks (18)–(20)). If a channel is available, BSC sends a command to BTS to activate a PDCH and to broadcast channel defining information on BCCH (block (21)). An optional channel defining signal (not shown in the figure) may also be sent directly to the MS, in order to provide a faster notification that a PDCH is allocated. At decision block (22), the MS determines if a PDCH is allocated. If this is the case, the MS may initiate a packet transfer on the defined PDCH. If no PDCH is allocated, the MS may proceed with a predefined procedure, such as periodically initiating a PDCH on demand allocation procedure (described in section I.C below). MSC/VLR is then, via the signal denoted (23), informed that the PD mode establishing procedure is completed. Signal (23) conveys information on the MS's cell location and, optionally, on whether a PDCH is allocated in the cell. This information is stored, linked to the PD mode registration (block (24)). As also indicated in block (24), if PD mode is monitored by a timer and/or inactivity timer, these timers, located in the PD controller (FIG. 1), are initiated.

The PD mode establishment procedure, described above, is primarily based on ordinary GSM signalling functions, controlled from the circuit mode MSC (FIG. 1), although some adaptations are required e.g. for handling the new type of service request and the new encryption parameters. When PD mode is established for an MS, parameters related to the MS are also transferred to a data base portion of the PD controller. This data base may be regarded as an extension of VLR for packet data MSs. An example of functional division between VLR and this PD controller data base is as follows (alternative realizations are not precluded):

VLR (as well as HLR) is enhanced with packet data subscription parameters such as IP address, multicast address, and timeout parameters. For an MS in idle mode, this information is always available in the current VLR by means of regular location updating procedures (adapted to handle the additional subscription parameters). VLR is also extended with information on whether an MS is in PD mode.

The PD controller data base provides:
a) Storage of operational parameters related to any MS in PD mode, including encryption parameters, timers, cell location, list of peer entities of any routes established, and the MS's current submodes (e.g. mobile/stationary mode, normal/sleep paging mode; see below).

b) In order to facilitate fast packet routing and limit the interrogation load of VLR, storage also of a duplicate from VLR of all relevant information stored for any MS in PD mode (including subscription parameters and location area identity).

c) To facilitate exchange of signalling information with the circuit mode MSC (FIG. 1), capability to, for any packet data MS registered in the MSC/VLR, translate the MS's IP address to IMSI.

d) As a support function to the PD router (FIG. 1), a table with routing information to any MS to which a route is established from the MSC. With the IP address of the MS as input, the table provides routing information to the MS's currently serving MSC.

Location updating for an MS in PD mode is based on idle mode location updating procedures. When an MS in PD mode moves to a location area belonging to a new MSC/VLR, the new VLR automatically receives the related subscription parameters (from HLR), as part of regular idle mode location updating. The location updating procedure is enhanced such that the new MSC/VLR is informed that the MS is in PD mode, and is provided information on the backbone network address of the previous MSC/VLR. Initiated by the PD controller in the new MSC/VLR, the MS's operational parameters are then transferred (across the backbone network) from the PD controller in the previous MSC/VLR, and the data bases of the two PD controllers are updated. The PD controller in the new MSC/VLR also provides updated routing information to peer entities of any routes established to the MS's current MSC.

A PD mode establishment procedure may also be initiated when a PD router in an MSC, currently serving an MS in idle mode, receives a packet addressed to the MS. The PD router then signals to the PD controller identifying the destination IP address. The PD controller finds that the MS is not in PD mode and, after translating the IP address to IMSI, requests the circuit mode MSC to initiate a PD mode establishment procedure. As the MS is in idle mode, the request is accepted and the circuit mode MSC initiates the procedure using regular GSM paging, but with a special "PD indicator". The procedure is then very similar to the one described above for the mobile originated case.

Returning to FIG. 4, the normal situation for an MS in PD mode is that it is located in a cell with at least one PDCH allocated. The first PDCH allocated in a cell, on which packet transfers are initiated, is here designated "Master PDCH" (MPDCH). In this normal situation, the MS performs what is here referred to as "PDCH procedures" (the upper smaller circle in FIG. 4). An MS, using "PDCH procedures":

a) Performs cell selection based on idle mode procedures:

Measures signal strength on current and surrounding cells (when not doing anything else, e.g. between PDCH slots of consecutive TDMA frames), and keeps an updated list of the 6 strongest BCCH carriers.

In connection with measurements, in order to identify BCCH carriers and read Base Station Identity Code (and TDMA frame number), listens to Synchronization Channel (SCH) of current cell, and Frequency Correction Channel (FCCH) and SCH of adjacent cells.

In order to read system and cell specific parameters, listens to BCCH and "extended BCCH" (if any) of current cell, and BCCH of adjacent cells.

Thus, the available framework for regular GSM broadcast control channels are utilized for performing cell selection. In the MS, the cell selection criteria may be somewhat modified compared to idle mode, if a user (e.g. with a keyboard command) selects to operate the MS in "stationary mode". In stationary mode, the MS retains the current cell as long as the signal quality is above a certain threshold value. The purpose is to reduce the probability of "unnecessarily" changing cell due to fluctuations in the radio environment, e.g. caused by reflections from moving objects. If the signal quality falls below the threshold value, the MS automatically returns to normal "mobile mode" of operation. The MS informs the PD controller in its currently serving MSC/VLR of its mode of operation, by sending a mobile/stationary mode indicator at least every time it changes from mobile to stationary mode, or vice versa. For data transfer to an MS in stationary mode, paging may then be limited to a single cell, or data may be sent directly (as "immediate data"/"immediate channel reservation" followed by data) without previous paging.

In an alternative realization of the embodiment, the modified cell selection criteria may be employed also for an MS in mobile mode. Provided that the information on the MS's cell location (stored in the PD controller) is sufficiently recently updated, packet transfer to the MS may be initiated in a similar way as to a "stationary" MS.

b) Listens to MPDCH and performs packet transfers as required. On MPDCH, an MS listens for:

Paging, in "normal" paging mode (during a period of relatively high packet transfer activity) or "PD sleep" paging mode.

The MS, explicitly or implicitly, informs the PD controller in its current MSC/VLR of its paging mode, by sending a normal/PD sleep mode indicator at least every time it changes paging mode.

"Immediate data" (or "immediate channel reservation" followed by data) without previous paging, in normal mode.

PDCH broadcast messages (i.e. unacknowledged messages to all MSs in a cell), in normal or PD sleep mode.

Multicast messages (i.e. unacknowledged messages addressed to a group of MSs), in normal or PD sleep mode.

c) Optionally, listens to GSM cell broadcast short messages (SMs).

Figure 6:
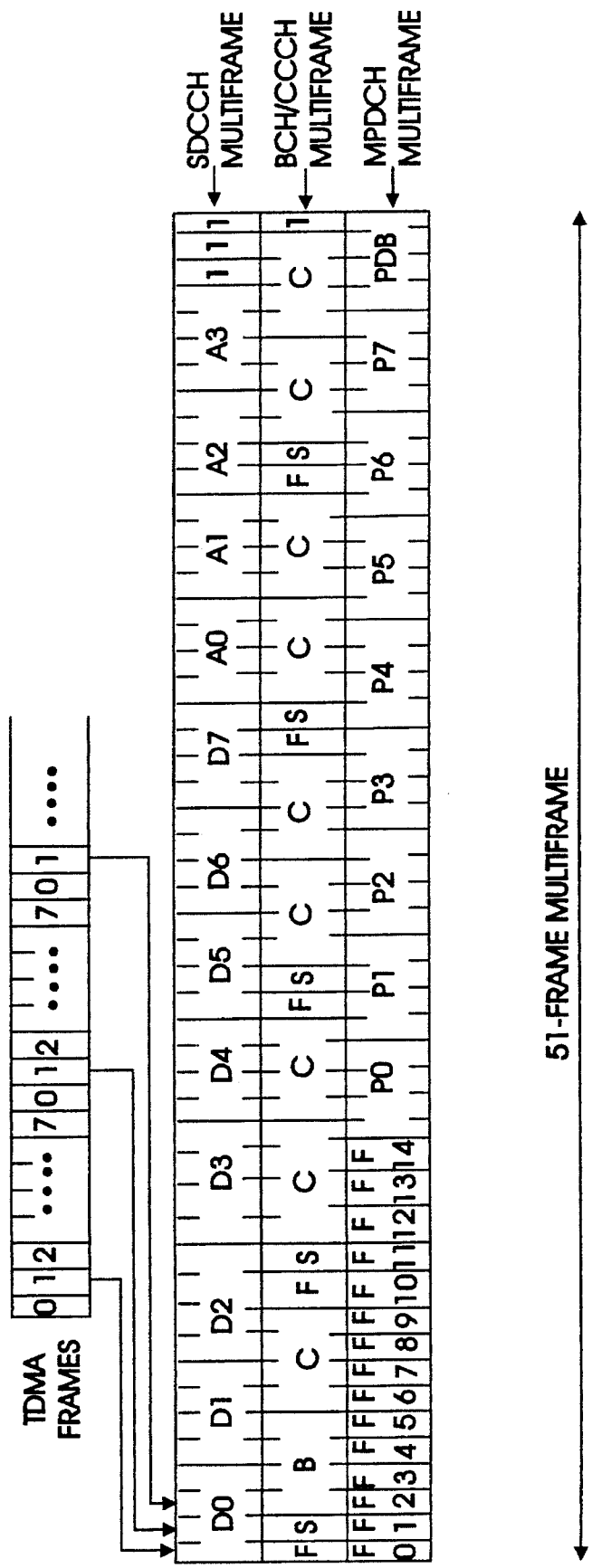
FIG. 6 shows an example of a 51-frame Master packet data channel (MPDCH) downlink multiframe, together with the multiframe cycle in FIG. 7 provided for coordinating listening to MPDCH with listening to regular GSM broadcast channels (applicable both to Embodiment I and "Embodiment II" below).

Coordination of the above procedures may be accomplished by employing for the MPDCH downlink a multiframe scheme similar to and synchronized with the 51-frame multiframe schemes used for regular GSM downlink control channels. Compared to idle mode, when an MS may listen to broadcast channels at any time except during its assigned (sleep mode) paging block, more extensive coordination is required for an MS in PD mode, and specifically when the MS is in normal paging mode. In the latter case, the time an MS is available for downlink messages needs to be maximized, while allowing sufficient time for the broadcast listening tasks. A multiframe coordination scheme with this purpose is exemplified in FIG. 6 and FIG. 7. FIG. 6 shows an example of a 51-frame MPDCH multiframe, synchronized with the corresponding GSM Broadcast Channel (BCH)/Common Control Channel (CCCH) and Stand-alone Dedicated Control Channel (SDCCH) multiframes. As depicted in FIG. 7, 8 MPDCH multiframes form a multiframe cycle (synchronized with the corresponding BCH/CCCH and SDCCH multiframe cycles). FIG. 7 also illustrates an example of scheduling adequate times for the tasks of listening to and reading information from ordinary GSM broadcast channels.

The MPDCH multiframe (FIG. 6) comprises:

Paging blocks (similar to GSM), marked P0–P7, each 4 TDMA frames long.

In PD sleep mode, an MS listens to one of the paging blocks (depending on its IMSI) in a subset of the multiframes in the cycle, as determined by a system parameter (giving a sleep mode period ranging between approximately 0.25 and 2 seconds). Multiframes 5 and 7 every Nth cycle are excluded, as these (as illustrated in FIG. 7) are scheduled for listening to adjacent BCCH.

In normal mode, an MS may be paged in all paging blocks, and at any time not scheduled for other purposes (see below). The same is true for "immediate data"/"immediate channel reservation".

A block marked PDB, used for PDCH broadcast (with the exceptions indicated in FIG. 7).

PDCH broadcast may, with a sleep mode parameter, be limited to a defined subset of the multiframes. The sleep mode parameter may be different from that used for paging.

PDCH broadcast is used for providing system information, including PDCH specific parameters, and a flag indication when relevant information on current BCCH has changed. MSs should then read BCCH and "extended BCCH" (if any), starting with the next multiframe and until the relevant information contents of all 8 multiframes have been read (see FIG. 7). PDCH broadcast may also be used for different kinds of user information services.

Frames marked F0–F14 which can be grouped in different ways for various purposes (see FIG. 7).

Furthermore, the block F3–F6 may (when not allocated for other purposes; see FIG. 7) be utilized for multicast messages. (Other multicast allocation alternatives exist.)

The BCH/CCCH multiframe is included in FIG. 6 to show the allocation of FCCH (marked F), SCH (marked S), and BCCH (marked B) used in the cell selection process. "Extended BCCH" (if provided) is allocated in the first "C" block from the left, in multiframes 4–7 (see FIG. 7). The purpose of showing the SDCCH multiframe in FIG. 6, is to indicate the allocation of cell broadcast SMs. These are allocated a subchannel utilizing the block marked "D2", in multiframes 0–3 (as shown in FIG. 7). A possible way to schedule listening to these broadcast channels is shown in the diagram of FIG. 7. The more precise block/frame allocation in the respective multiframe is defined in the column at the right hand side.

As indicated in FIG. 7, for listening to FCCH and SCH of adjacent cells, opportunities are provided twice per cycle (i.e. approximately once per second). As the multiframes of adjacent cells may be unsynchronized with those of the current cell, 12 consecutive frames need to be assigned.

An MS that needs to read information from BCCH of an adjacent cell, should read at least one BCCH block from multiframes 2, 3, 6 or 7 in a multiframe cycle. This is achieved with the reading schedule in FIG. 7, again taking into account that multiframes of adjacent and current cells may be unsynchronized. The time indicated for reading adjacent BCCH is assigned once every N:th cycle, where N is a system parameter.

In some situations, an MS in PD mode temporarily has to be "off PDCH" and use ordinary GSM channels and perform what is here denoted "GSM procedures". It is then accessable by and has access to the same signalling as in idle mode. It also performs cell selection exactly as in idle mode. Common situations when the MS changes to these "GSM procedures" (transition marked (3) in FIG. 4) are:

a) When the MS moves to a new location area. It then performs location updating based on idle mode procedures. Upon completion, the MS returns to "PDCH procedures" (transition (4) in the figure).

b) At regular intervals, when the MS performs periodic registration as in idle mode. Upon completion, the MS returns to "PDCH procedures" (transition (4)).

c) When the MS (on PDCH) receives a request from its current MSC to perform authentication or equipment identification. The requested procedure is then performed in an essentially regular GSM manner. After granted and completed procedure, the MS returns to "PDCH procedures" (transition (4)). If the authentication or equipment identification is rejected, the procedure ends with the MS receiving a "PD mode termination command", returning the MS to idle mode (transition (5)).

d) When the MS moves to a cell where no PDCH is allocated but where a PDCH may be allocated on user demand. In such a cell, the MS may be paged via ordinary GSM paging channel.

Depending on system configuration (operator's choice), the MS may be required to report to its current MSC/VLR when it moves from a cell with PDCH allocated to one without, and vice versa. This information is stored in the PD controller (FIG. 1) which thus monitors the procedures used by the MS. In this case, paging is made on either MPDCH or ordinary GSM paging channel. In a system where the PD controller does not have this information, paging has to be made in parallel on both MPDCH and ordinary GSM paging channel, if the paging area comprises cells of both kinds.

A PDCH may be allocated when an actual need for packet transfer arises as described in section I.C below. The MS returns to "PDCH procedures" (transistion (4)) when a PDCH is allocated, or when the MS moves to a cell with PDCH allocated.

e) When the MS moves to a cell not supporting PDCH. This case is similar to d) above with the difference that no PDCH may be allocated. Moreover, packet data paging (using ordinary GSM paging channel) may or may not be made in this type of cell, depending on system configuration.

For a combined MS, supporting both packet data and ordinary GSM services (but not simultaneously), a number of mixed traffic situations are possible. An MS in PD mode may make or receive a regular GSM (voice/circuit data/ point-to-point short message) call with the PD mode maintained as "pending" during the call and returned to "active" when the call is completed. To make a call, the MS, if it was using "PDCH procedures", first changes to "GSM procedures" (transition (3) in FIG. 4). When using "GSM procedures", the MS initiates a call in a regular GSM manner and, when the call is set up, changes to call-connected mode (transition (6)). Via the circuit mode MSC (FIG. 1), the PD mode is marked as "pending" in VLR and in the data base portion of the PD controller (FIG. 1). When the call is completed, the MS returns to "active" PD mode (transition (7) in FIG. 4) and is marked accordingly in VLR and the PD controller.

If an ordinary GSM call to an MS in PD mode is received by a circuit mode MSC, the circuit mode MSC, after finding from VLR that the MS is in PD mode, requests the PD controller to initiate paging of the MS. If the PD controller has information on the procedures used by the MS, paging is initiated accordingly using either MPDCH, for which special paging types are provided to convey GSM calls, or ordinary GSM paging channel (via the circuit mode MSC). Should such information not be available in the PD controller, paging may involve both types of channels in different cells. If the MS indicates "accept" in its paging response, the call, after the MS having changed to "GSM procedures" as required, is set up and PD mode is kept "pending" during the call in a similar way as discribed above for a mobile initiated call.

If a packet, addressed to an MS in GSM call-connected mode, is received by a PD router (FIG. 1), the associated PD controller, finding that the MS is not in PD mode, requests the circuit mode MSC to initiate a PD mode establishment procedure as described above. However, as the MS is in call-connected mode, the request is rejected. This may result in the PD router sending an upstream error report, indicating that the MS is unreachable. In a similar situation when the MS is instead in "PD pending mode", the result is almost the same. The difference is that the circuit mode MSC does not need to be involved, as the MS mode information is available in the PD controller. For an MS subscribing to mail service, the message delivery in these and similar situations may be deferred until the MS becomes available.

As indicated above, PD mode for an MS may be monitored by a timer and/or inactivity timer, handled by the PD controller in the MSC/VLR currently serving the MS. When PD mode is established, each timer provided is initiated to count a predetermined period of time (timeout period). The inactivity timer is reset and reinitiated for any packet received from or sent to the MS. The time out periods may be subscription parameters. Termination of PD mode and return to idle mode (transition (2) in FIG. 4) may be initiated by a termination request from the MS, or by a termination command from the PD controller when a timeout occurs.

If a periodic registration is not received as required from an MS in PD mode, the PD mode is terminated, by first changing the MS mode to idle (transition (2)), and then marking the MS as "detached" in VLR according to ordinary idle mode procedures. An MS wishing to initiate an explicit "detach", first initiates a change to idle mode (transition (2)) and then sends an "IMSI detach" as an idle mode.

When PD mode is terminated, peer entities of any routes established are informed and the routes are terminated.

Some additional mobility management aspects related to mobile terminated packet transfer are described in section I.D.

I.C Provision of Packet Data Channels (PDCHs)

The main function blocks involved in providing PDCHs are (see FIG. 1):

The transceivers in BTS which are enhanced with capability to:

Dynamically change the configuration of any physical channel (time slot) from regular GSM traffic channel TCH to PDCH, and back to TCH, on PDCH allocation/ PDCH release command respectively from the PD transfer controller.

When frequency hopping is employed, adapt PDCH(s) to comply with the hopping sequence used.

The PD transfer controller in BTS which is processor-based and comprises both software and hardware. It:

Controls allocation/release of PDCHs on command from the PDCH allocation controller in BSC.

Controls packet transfers and handles the radio link protocol for PDCH(s) allocated, in accordance with the multiframe coordination scheme (described in section I.B).

As part of a dynamic channel allocation process, monitors traffic load on PDCH(s) and generates PDCH allocation/PDCH release requests to the PDCH allocation controller in BSC, as required.

The PDCH allocation controller in BSC which is processor-based and comprises both software and hardware. Together with the "circuit mode BSC", which has the overall responsibility for radio channel resources, it coordinates allocation of PDCHs such that, from a common pool of physical channels (time slots), a variable mix of TCHs and PDCHs may be allocated determined by demand. In this process, the PDCH allocation controller:

Collects requests for PDCH allocation/PDCH release and conveys the requests to the circuit mode BSC.

Receives commands for PDCH allocation/PDCH release from the circuit mode BSC and conveys the commands to the PD transfer controller in BTS.

Supplies the information that on a per cell basis defines the degree of PDCH support provided and the MPDCH allocated (if any), and that is broadcasted on BCCH by the respective BTS.

In addition, interface functions and some common control functions in BTS are adapted to support the new PD functions (FIG. 1).

The first PDCH in a cell (the "master PDCH" MPDCH), that is capable of carrying the necessary control signalling for initiating packet transfer as well as packet data and that is defined by cell specific information on BCCH, may be allocated either by system configuration or on user demand. "PDCH on demand" support may be of particular interest in a low capacity (e.g. single carrier) cell, only occasionally visited by a packet data user.

In a "PDCH on demand cell", an MPDCH may be allocated when an actual need for packet transfer arises:

a) When PD mode is established for an MS (located in the cell), an MPDCH is allocated (if a channel is available) as the last part of the PD mode establishment procedure as described in section I.B. The PDCH allocation is initiated by a command from the circuit mode BSC to the PDCH allocation controller.

b) When an MS in PD mode (located in the cell) has data to send, it makes a "PDCH allocation request" using "GSM procedures" as illustrated in FIG. 8. The signalling sequence (1)–(4) is based on standard GSM signalling with the addition of a new type of service request (signal (3)). The service request is received by the circuit mode BSC which, if a channel is available, generates a PDCH allocation command to the PDCH allocation controller. An MPDCH is then allocated (block (6)) and channel defining information is broadcasted on BCCH (block (7)). An optional channel defining signal (not shown in the figure) may also be sent directly to the MS, in order to provide a faster response. At decision block (8) the MS determines if a PDCH is allocated. If this is the case, it may proceed with initiating a packet transfer on the defined MPDCH. If no PDCH is allocated, the MS may proceed with a predefined procedure, such as periodically repeating the PDCH allocation request.

c) When a packet addressed to an MS in PD mode (located in the cell), is received by the MS's currently serving MSC/VLR, an MPDCH is allocated (if a channel is available) if the following paging, using GSM paging channel, results in a positive paging response. With the addition of an initial paging, the procedure is very similar to the one described above for the mobile originated case.

d) In a situation when an MS, in PD mode and located in an adjacent cell where PDCH is allocated, has a data communication session in progress or has data ready to send immediately prior to moving into the "PDCH on demand cell", it may initiate a "PDCH allocation request" for the new cell, using the MPDCH in the currently serving cell. The request is transferred to the PD controller in MSC/VLR, from which it is forwarded to the PDCH allocation controller in BSC, and from there to the circuit mode BSC. If the request is granted, the MS may not need to change to "GSM procedures".

When a first PDCH (MPDCH) has been allocated, additional "slave PDCHs" (SPDCHs) may be allocated depending on traffic load:

Either semi-permanently (e.g. different mix of PDCHs and GSM traffic channels TCHs at different times of the day).

Or dynamically adapted to the current load situation.

In case of multiple PDCHs allocated to a cell, the PDCHs may be used as a set of "trunked" channels utilizing a dynamic assignment protocol. MPDCH is then used for access control signalling (including channel request, channel reservation and paging) and, as far as capacity admits, data, whereas SPDCH(s) are used for reserved data transfer.

Furthermore, in a situation when the MPDCH becomes a bottleneck, it is possible to allocate one or more additional MPDCHs such that a group of (m) MPDCHs may be used together with a group of (s) SPDCHs. Each MS is then assigned to a particular MPDCH determined by an algorithm based on the MS's identity (IMSI) and on control information broadcasted on BCCH and/or one or more of the MPDCHs.

Figure 9A:
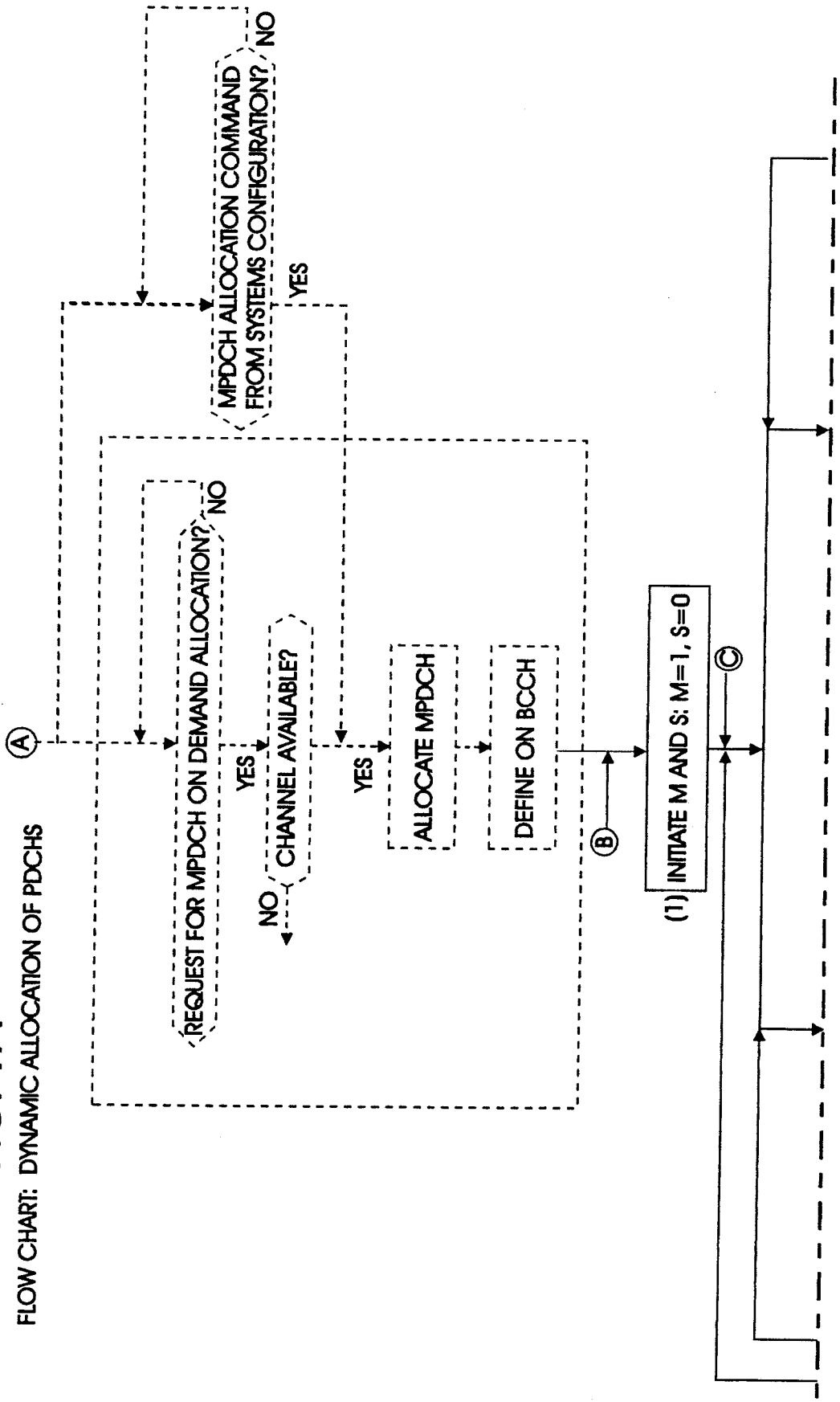
FIGS. 9, 9A, 9B, and 9C show a flow chart, illustrating the process of dynamically allocating PDCHs based on throughput measurements (applicable both to Embodiment I and II).
Figure 9B:
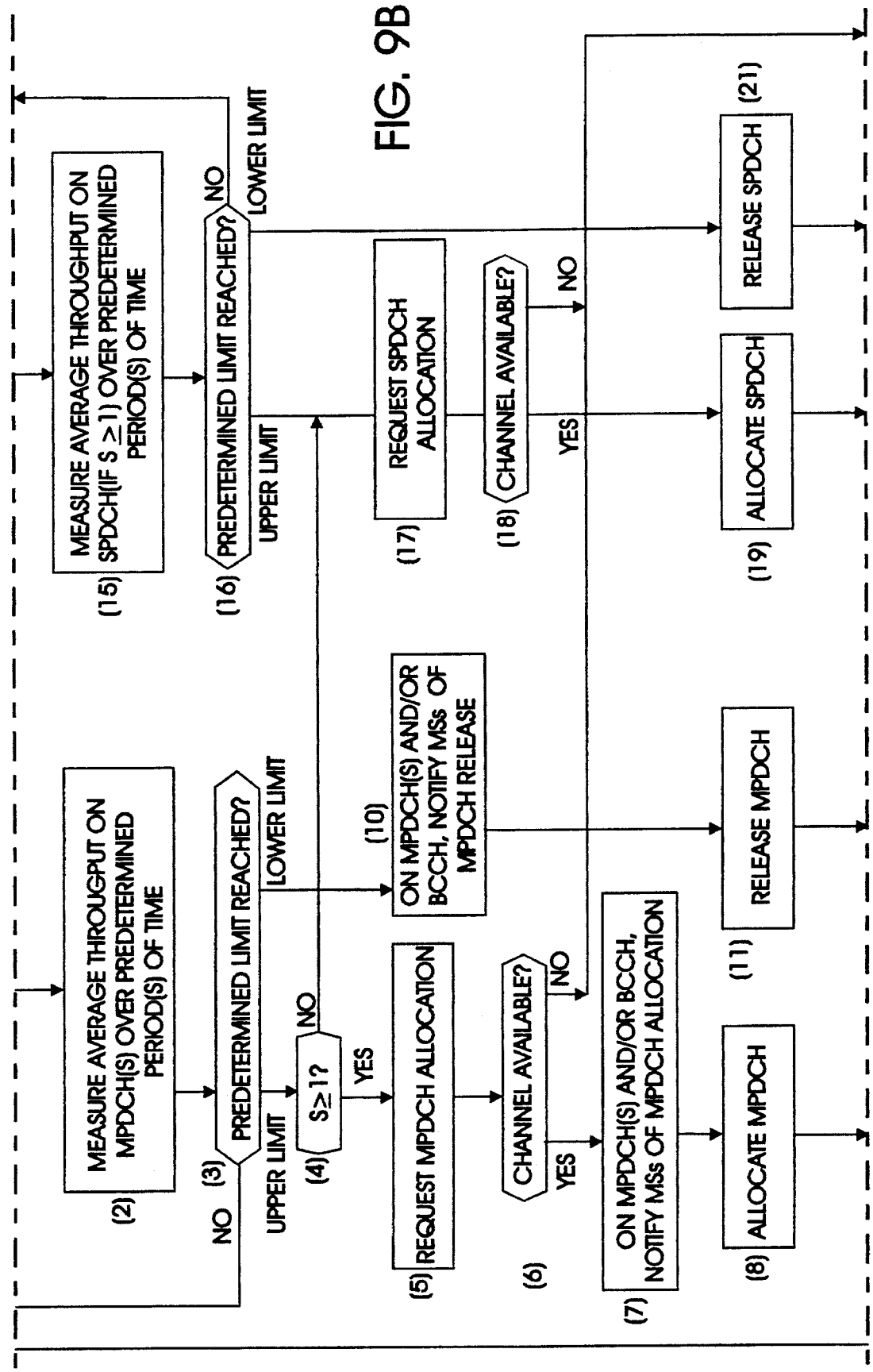
Figures 9, 9C:
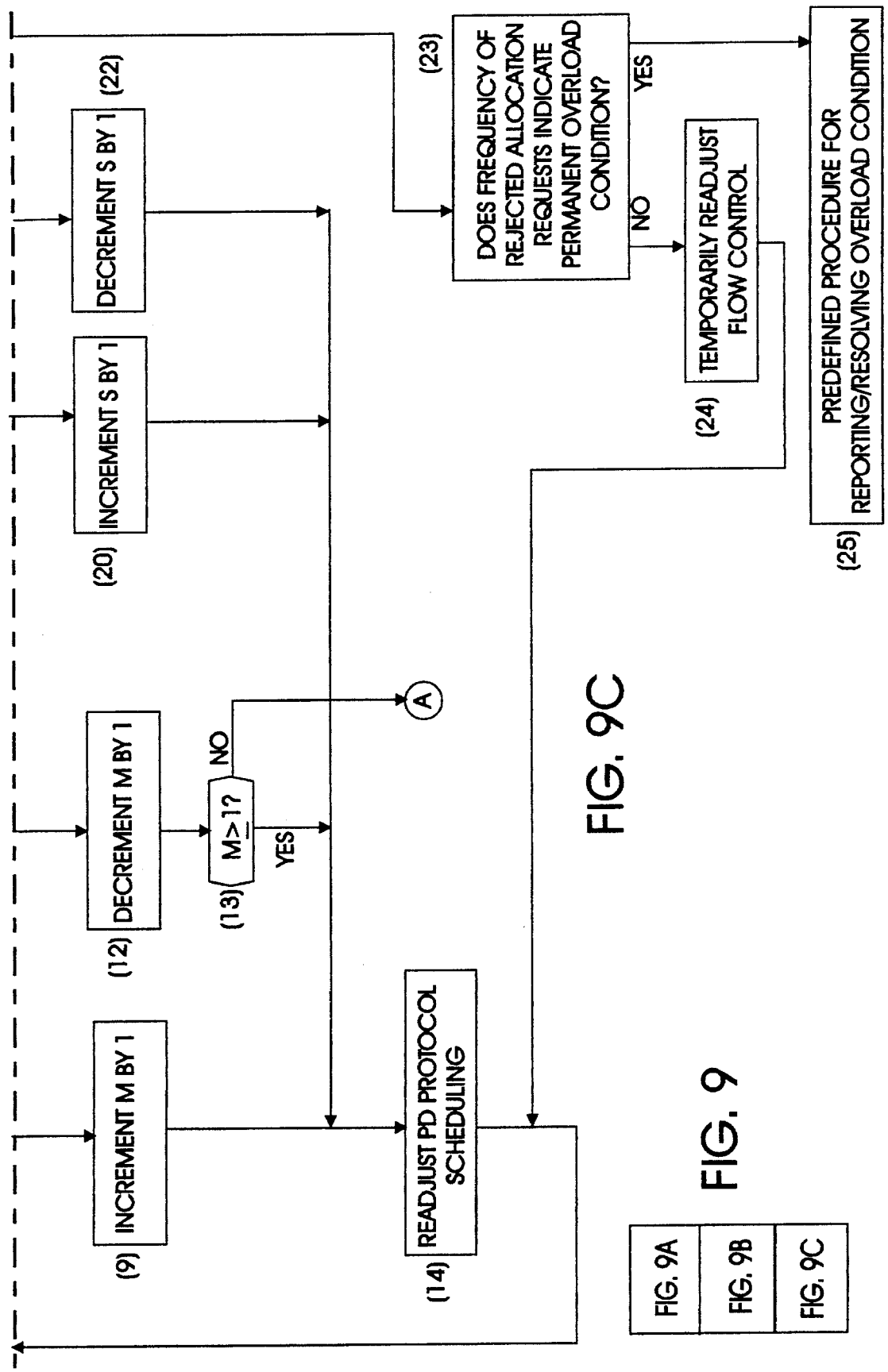

The process of dynamically allocating/releasing PDCH(s) in a cell is based on measuring throughput and comparing with predetermined limits as illustrated in FIG. 9. The upper dotted part of the flowchart illustrates allocation of a first MPDCH either on demand or as a result of system configuration. At block (1), the counts of allocated MPDCHs (m) and SPDCHs (s) are initiated.

At block (2), the average throughput across MPDCHs is measured (in BTS) over predetermined period(s) of time. At block (3), it is determined if an upper limit (measured over an associated "upper limit period of time") or a lower limit (measured over an associated "lower limit period of time") is reached.

If no, the monitoring process proceeds.

If the upper limit is reached and if, as in this example, no SPDCH is allocated (s=0), BTS sends an SPDCH allocation request to BSC (block (17)). BSC determines if a channel is available (block (18)).

If yes: Initiated from BSC, an SPDCH is allocated in BTS (blocks (19) and (20)). The packet data protocol scheduling in BTS is readjusted to the new PDCH configuration (block (14)). The process then proceeds with throughput measurements across MPDCH(s) (block (2)) and in a similar way across SPDCH(s) (block (15)).

If no: A check is made whether the frequency of rejected channel allocation requests indicates a permanent overload condition (block (23)). In that case, a predetermined procedure for reporting/resolving the problem is initiated (block (25)). Otherwise, the traffic load is temporarily limited by (in BTS) readjusting flow control parameters (block (24)). The cycle is then repeated, starting at block (2).

If the lower limit is reached (at block (3)), BTS sends an MPDCH release request to BSC. After notifying MSs by means of broadcast information (block (10)), an MPDCH is released (blocks (11) and (12)). If, as in this example, it is found (at block (13)) that this was the only MPDCH, the process proceeds at point (A) with monitoring any request or command for a new MPDCH allocation.

If, in another case, it is determined at (block (13)) that at least one MPDCH is still allocated, the process, after readjustment of the packet data protocol scheduling at block (14), proceeds at point (C).

Although a particular example has been described, it should be understood from the flow chart that the process of dynamically allocating/releasing PDCH(s) applies for any given configuration of MPDCH(s) and SPDCH(s).

I.D Packet Transfer Within an MSC Service Area

Packet transfer between the PD router in MSC/VLR (FIG. 1) and MSs in the MSC service area is to a large extent determined by the radio link (layer 2) service provided by PDCHs. Variable length packets up to some maximum size (such as approximately 600 octets, depending on the PDCH protocol) from layer 3 are accepted by the layer 2 entity in the PD router and by the MT part of MSs respectively. Each packet, normally after encryption, forms the information field of a layer 2 frame. Across the radio link (between BTS and MT), each frame is divided into fixed size blocks (of approximately 25 information octets, corresponding to 4 TDMA bursts). For each block, BTS or MT respectively performs channel coding, burst formatting, and interleaving (per block). A selective repeat type of ARQ protocol between BTS and MT then provides retransmission of blocks in error.

The TDMA structure and the need to allow for the same degree of timing disalignment at first MS access as in ordinary GSM have lead to the selection of a "reservation-Aloha" type of protocol. To initiate a packet transfer in the mobile originated direction, illustrated by the sequence diagram in FIG. 10, an MS makes a random access request (signal (1) in the figure) on the MPDCH uplink (using the same type of access burst as in ordinary GSM), when allowed to do so, as determined by "uplink state flags" (USFs) on the MPDCH downlink. The access burst includes a random number providing an initial identification of the MS, and may also include class of service type of information.

BTS normally responds with a channel reservation command (signal (2)) on the MPDCH downlink, reserving channel capacity for uplink data transfer and down link acknowledgement (ACK). (In case of no response from BTS, the MS makes a retry after a random backoff time.) The channel reservation command includes the same random number as received in the access burst, and timing alignment/power control (TA/PC) commands. The timing alignment/power control functions are performed in BTS, not only the measurements part (as in ordinary GSM) but also, for performance reasons, the processing and command generation parts (located in the PD transfer controller).

The data frame (signal (3) in the figure) from the MS is followed by a positive acknowledgement (signal (4)) from BTS (as no retransmissions are assumed in this example), and the frame is relayed to the PD router in MSC/VLR. Here, the MS's cell location is determined by associating the frame (which includes the MS's identity TMSI in the frame header) with the (for each cell unique) physical connection on which the frame is received. In an alternative realization, the MS's cell location may be identified by providing in the PD transfer controller in BTS the additional function of inserting a cell identifier in the frame header, in a similar way as described in the cited U.S. Pat. No. 4,916,691. The cell location identity and the associated time when the frame was received are, together with MS parameters (such as mobile/stationary indicator, class of service) that may be conveyed in the frame header from BTS, stored in the PD controller data base, linked to the MS's identity. The packet, normally after decryption, is then available at the layer 3 entity of the PD router for routing to the destination (in the example in FIG. 10 via an IWF).

When a packet, addressed to an MS is received by the PD router in the MSC/VLR where the MS is registered and it is found from the data base in the PD controller (FIG. 1) that the MS is in PD mode, the packet is first fragmented, as required, to match the maximum packet size across PDCHs. The way the packet transfer to the MS is initiated then depends on the MS operational parameters available in the PD controller data base:

Cell location and recentness of the information
Mobile or stationary mode of operation
Normal or PD sleep paging mode
"PDCH" or "GSM procedures" used (depending on system configuration, as described in section I.B)

Based on this information, the PD controller uses a software algorithm to select method for initiating the packet transfer:

a) Transferring the Data Frame Directly to a Specific BTS (Without Previous Paging)

This method is used if the MS is in stationary mode. It may be used also when the MS is in mobile mode, provided that the modified cell selection criteria employed in stationary mode (described in section I.B) is employed also for MSs in mobile mode, and provided that the cell location information is sufficiently recently updated.

The frame header in the transfer to BTS includes TMSI, an indicator of the MS's paging mode, IMSI (if the MS is in PD sleep mode), and possible class of service information. If the MS is in PD sleep mode, BTS then initiates the data transfer across PDCH(s) using paging (in a single cell). Otherwise, the data transfer is initiated with "immediate channel reservation", or data may be sent directly as "immediate data" on MPDCH.

An "immediate channel reservation" transfer sequence is exemplified in FIG. 11. The channel reservation (signal (5)) on the MPDCH downlink informs the MS of the channel on which the data frame (signal (6)) is to be received. If the data transfer takes place on an MPDCH, channel reservation may not be needed. The data frame includes reservation of an access slot on the MPDCH uplink for the MS to respond. In the response burst (signal (7)), one bit is allocated for acknowledging the data frame. If, as in the example, the acknowledgement is positive, the sequence is completed. In case of a negative acknowledgement, BTS sends a channel reservation for a more specified negative acknowledgement from the MS (defining blocks to be retransmitted), and for retransmission from BTS. This channel reservation also includes TA/PC commands. The retransmission then includes channel reservation for the MS to acknowledge and for a possible further retransmission.

b) Paging Over a Group of Cells

To economize on spectrum, paging is limited to the smallest possible group of cells based on available cell location information. Paging is initiated by a "high level command" (including information on IMSI, TMSI, location area, cell location and recentness of this information, and paging mode) from the PD controller to the PD signalling controller (FIG. 1) in affected BSC(s). (Alternative divisions of paging functions between MSC and BSC are not precluded.) As described in section I.B, depending on system configuration, the paging may include paging on both MPDCH and ordinary GSM paging channel and may thus involve also the "circuit mode" portion of BSC(s).

In a situation when the probable cell location can be limited to a small group of cells, a special type of paging message may be employed which combines paging with reservation of an access slot for the MS to respond. An example of using this type of paging is shown in the sequence diagram in FIG. 12. With the signal marked (5) in the figure, the paging command initiated by MSC reaches BTS. The PD transfer controller in BTS then generates a paging message (signal (7)) on the MPDCH downlink which includes reservation of an access slot on the MPDCH uplink for the MS to send a response burst (signal (8)). The paging response (signal (9) and (12)) transferred back to MSC includes information on the MS's cell location, which information (with the associated time when the paging response was received) is stored in the PD controller data base. The paging response also results in a channel reservation (signal (10)) on the MPDCH downlink for the data transfer. The channel reservation also includes TA/PC commands. When data is received from MSC (signal (13)), it is transferred on the reserved PDCH downlink (signal (16)). Channel reservation for an acknowledgement from the MS (signal (17)) and for possible retransmission may either be combined with the data frame (signal (16)) or included in the initial channel reservation (signal (10)).

When this type of paging is used to convey an ordinary GSM call, one bit in the response burst is allocated to indicate "accept" or "reject" to the call, after which the sequence is completed.

The advantage with this type of paging, that includes reservation of an access slot for a paging response burst, is that the response can be uniquely identified in spite of the fact that it only comprises 8 bits of information. In this way, the sequence can be considerably shortened compared to ordinary GSM paging, which is of importance considering packet transfer delays. However, this type of paging is spectrum efficient only when used over a small group of cells.

As minimization of the total usage of radio channel resources for location updating/cell location reporting on one hand, and paging on the other, is crucial for spectrum efficiency, some complementary mechanisms may be needed for MSs in PD mode. These may include the use of smaller location areas than in regular GSM and/or, under certain conditions, cell location reporting from MSs.

Concerning timing alignment/power control, the need for renewal within a certain period of time imposes restrictions on maximum packet size. For example, the TA/PC commands included in the channel reservation (signal (10)) in FIG. 12 should, with a maximum size packet in the data frame (signal (16)), allow adequate timing alignment and power control at least until the acknowledgement (signal (17)) is received from the MS. A maximum packet size of approximately 600 octets, should provide sufficient margins. As required, additional TA/PC commands (as well as channel reservation commands) may be included in later parts of a sequence, combined with negative acknowledgement(s) or retransmission(s).

Figure 13:
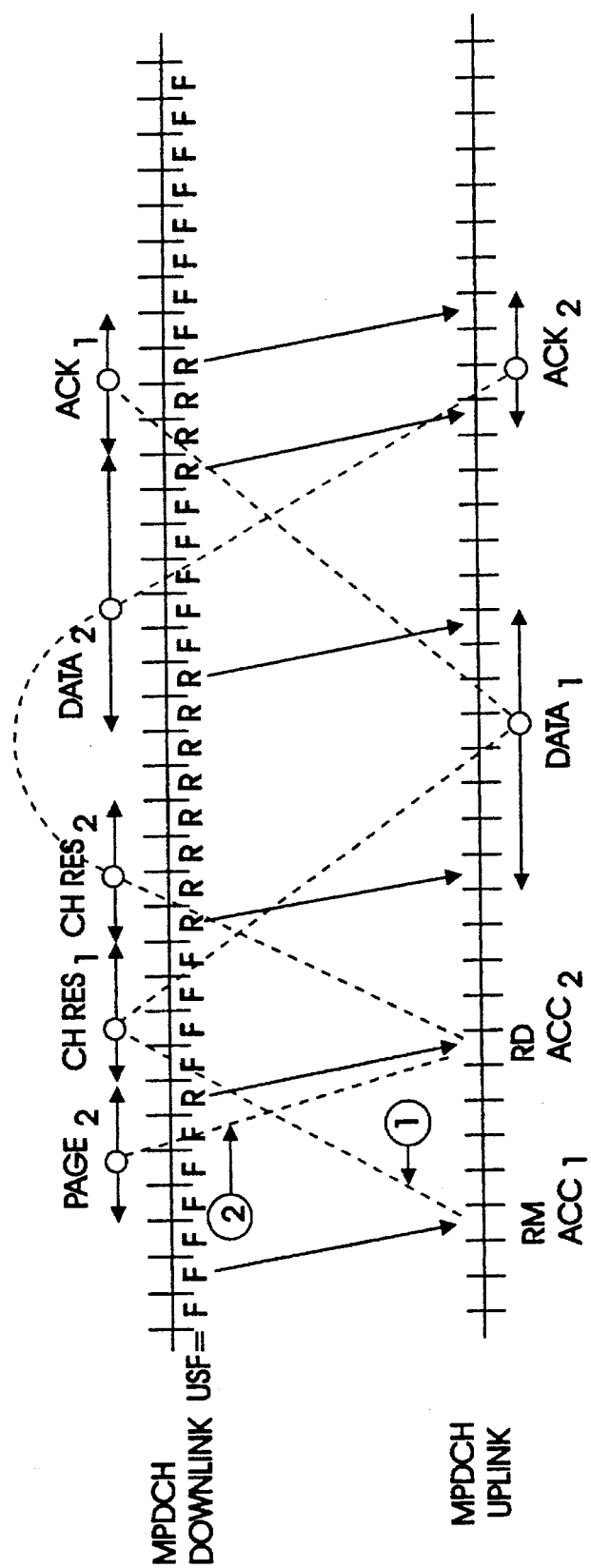
FIG. 13 shows examples of a mobile originated and a mobile terminated packet transfer on an MPDCH, thereby illustrating the principles of using Uplink State Flags (USFs) and a type of paging that reserves an access slot for the MS to respond (applicable both to Embodiment I and II).

The principles for the mentioned uplink state flags (USFs) and for the type of paging that reserves an access slot for the MS to respond are illustrated by the examples in FIG. 13. The series of slots that depict MPDCH downlink and uplink respectively represent time slots in consecutive TDMA frames. The figure shows two simple transfer examples, one mobile originated (with index 1) and one mobile terminated (with index 2). All control messages (except access bursts) comprise one block (i.e. 4 bursts). An USF on the MPDCH downlink marks a corresponding access slot on the MPDCH uplink as either "free" (for random access) or "reserved". In this example, USFs are coded individually per MPDCH downlink burst (by allocating a group of redundant bits, carrying one bit of information, for this purpose). An USF in TDMA frame n governs access in TDMA frame n+m. In this example, m−1.

The mobile originated data transfer starts with a random access burst from mobile station MS 1 in an access slot that is marked as "free" by an USF. BTS responds with a channel reservation command on the downlink and changes USF to "reserved" for the duration of the subsequent uplink data transfer. A downlink acknowledgement then completes the transfer sequence.

The mobile terminated transfer is initiated by a paging message to mobile station MS 2 providing the MS a reserved slot for its response burst. The paging response is followed by a channel reservation command and a subsequent downlink data transfer. After an acknowledgement from the MS in a reserved uplink block, the sequence is completed.

A paging message may include paging of more than one MS and then includes reservations of individual access slots for the MSs to respond. The reservations may be explicit (in the form of pointers) or implicit, in which case the next few reserved slots are allocated to the MSs in the order they appear in the paging message.

The described principle for access slot reservation may be used also in the "immediate channel reservation" example above.

USFs may alternatively be included in the block channel coding and interleaving, and thus be provided on a per block basis. After receiving a block, an MS then knows the USFs (which may still be associated with individual access slots) for the 4 following access slots.

I.E Packet Routing To and From MSC Service Areas

Routing of packets from entities on the backbone network (FIG. 1) to an MS in PD mode is, as mentioned, based on establishing and maintaining routes to the MS's currently serving MSC, by means of:

From initiating entities, initially interrogating HLR, via the HLR interrogation server.

In the PD controller data base in the MS's current MSC/ VLR, storing a list of peer entities of any routes established, linked to the MS's PD mode registration.

When the MS moves to a location area belonging to a new MSC/VLR, transferring the list of peer entities (and other parameters related to the MS) from the old to the new MSC/VLR, and updating the peer entities with routing information to the new MSC.

To be able to provide the necessary routing information, HLR is enhanced to provide, at the initial interrogation when a route is being established, the IP address of the MSC currently serving the MS in question. HLR is informed of this IP address by means of an extension, for packet data MSs, of the procedure used when an MS registers in an MSC/VLR. The information sent from MSC/VLR to HLR at registration is then extended to include the MSC's IP address.

Furthermore, each route may be monitored by an inactivity timer, handled by the PD controller in the MSC/VLR currently serving the MS. When the route is established, the inactivity timer is initiated to count a predetermined period of time (timeout period). The inactivity timer is reset and reinitiated for any packet received from the route, addressed to the MS. The timer is reset and reinitiated also for any packet from the MS to the route, when the route is a bidirectional route between the MS's current MSC and another MS's current MSC, linked to the two MSs' respective PD mode registrations. The timeout period may be a subscription parameter. When a timeout occurs, the peer entity is informed and the route is terminated.

The method used for routing packets in the mobile terminated direction to an MS's currently serving MSC depends on the IP addressing scheme chosen for the packet data PLMN. If the addressing scheme is such that the network identifying portion of an MS's IP address identifies the MS as belonging to a particular PLMN, or subdomain of a PLMN including a group of MSCs, the routing method illustrated by the example in FIG. 14 may be used. Referring to the sequential steps indicated in the figure:

1) IWF 1 receives a packet addressed to MS 1.
2) As required, IWF 1 performs protocol conversion and address translation (from the external network to the intra-PLMN IP network). The address translation data base may be available locally at the IWF or via remote access. When a route has been established for an MS, the address translation is performed locally.

IWF 1 determines, from an internal data base that stores routing information for any MS for which a route is established, if a route is established to MS 1's current MSC. If a route is established, the sequence proceeds with 7). Otherwise, it proceeds with 3).

3)–4) IWF 1 interrogates HLR via the HLR interrogation server.
5)–6) The response from HLR includes the IP address of MS 1's current MSC (MSC 2).
7) The packet is encapsulated with MSC 2's IP address as destination address and IWF 1's IP address as source address. The encapsulated packet is routed to MSC 2.
8) The packet is decapsulated and address information is analysed by the PD router and PD controller in MSC/VLR 2 respectively (FIG. 1). The PD controller determines if MS 1 is in PD mode.

If no: A PD mode establishment procedure is initiated (discribed in section I.B).

If yes: The PD controller determines if a route from IWF 1 (IWF 1 being identified by the source address in the encapsulated packet) is established for MS 1 (i.e. if IWF 1 is included in the list of peer entities linked to MS 1).

If yes: If the route is monitored by an inactivity timer, the timer is reset and reinitiated. The sequence then proceeds with transferring the packet to the MS (as described in section I.D).

If no: The IP address of IWF 1 is stored (linked to MS 1's identity), indicating that a route is being established. If the route is to be monitored by an inactivity timer, the timer is initiated. The sequence then proceeds with 9).
9) MSC 2 notifies IWF 1 that a route segment is established.
10) IWF 1 acknowledges.
11) IWF 1 stores (linked to MS 1's identity) the IP address of MSC 2 (MS 1's current MSC).

When the PD router in an MSC/VLR (MSC/VLR 1) receives a packet instead originated from an MS (MS 1) within the MSC service area, the network identifying portion of the destination IP address is first analysed. If the destination address is not within the range of addresses assigned to MSs belonging to the PLMN, the packet is routed according to normal IP routing rules. If, on the other hand, the destination address is within this range of addresses and thus belongs to an MS (MS 2), the "extended VLR data base" in the PD controller is interrogated. With the above mentioned addressing scheme, the routing method may then comprise the following steps:

1) The PD controller (in MSC/VLR 1) determines if a route is established to MS 2's current MSC, linked to MS 1's PD mode registration (and to MS 2's identity).

If yes: If the route is monitored by an inactivity timer, the timer is reset and reinitiated. The packet is then either transferred to MS 2, if MS 2 is registered in the same MSC (MSC 1), or routed to MSC 2's current MSC using the encapsulation technique described above.

If no: The sequence proceeds with 2).
2) The PD controller checks if a route is established to MS 2's current MSC, linked to any of the other MSs registered in MSC/VLR 1.

If yes: The packet is either transferred to MS 2, if MS 2 is registered in the same MSC (MSC 1), or routed to MS 2's current MSC using the encapsulation technique described above. MS 2's current MSC then initiates establishment of a (bidirectional) route between the two MSs' current MSCs, linked to their respective PD mode registrations. If the route is to be monitored by inactivity timer(s) (at one or both ends of the route), the timer(s) are initiated.

If no: The sequence proceeds with 3).
3) The PD controller determines if MS 2 is registered in MSC/VLR 1.

If yes: As required, a procedure for establishing PD mode for MS 2 is initiated. If or when PD mode is established, a (bidirectional) route is established as a linkage between the two MSs' respective PD mode registrations. In this way, the route between the two MSs' respective current MSCs can be maintained if any of the MSs moves to another MSC/VLR.

(Inactivity timer(s) are, when applicable, initiated as in 2) above).

If no: The sequence proceeds with 4).
4) The PD controller initiates a procedure, including HLR interrogation, for establishing a route to MS 2's current MSC, in a similar way as in the above example of route establishment from an IWF. If successful, the procedure ends with a (bidirectional) route being established between the two MSs' respective current MSCs, linked to their respective PD mode registrations.

Figure 14:
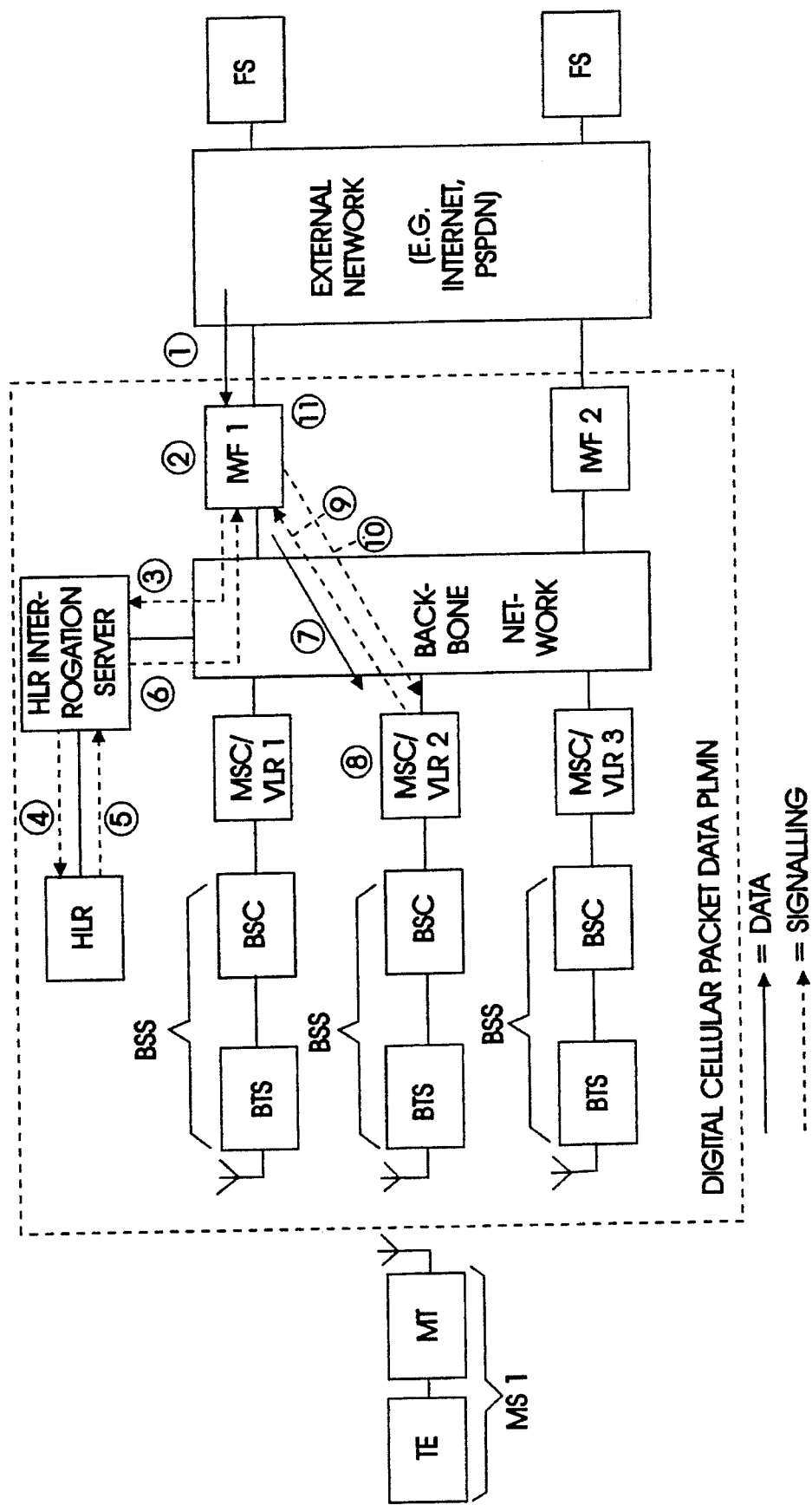
FIG. 14 illustrates an example of routing from an interworking function (IWF) to an MS's currently serving Mobile services Switching Centre (MSC) in Embodiment I, when the addressing scheme chosen is such that an MS's IP address identifies the MS as belonging to a particular public land mobile network (or group of MSCs).
Figure 15:
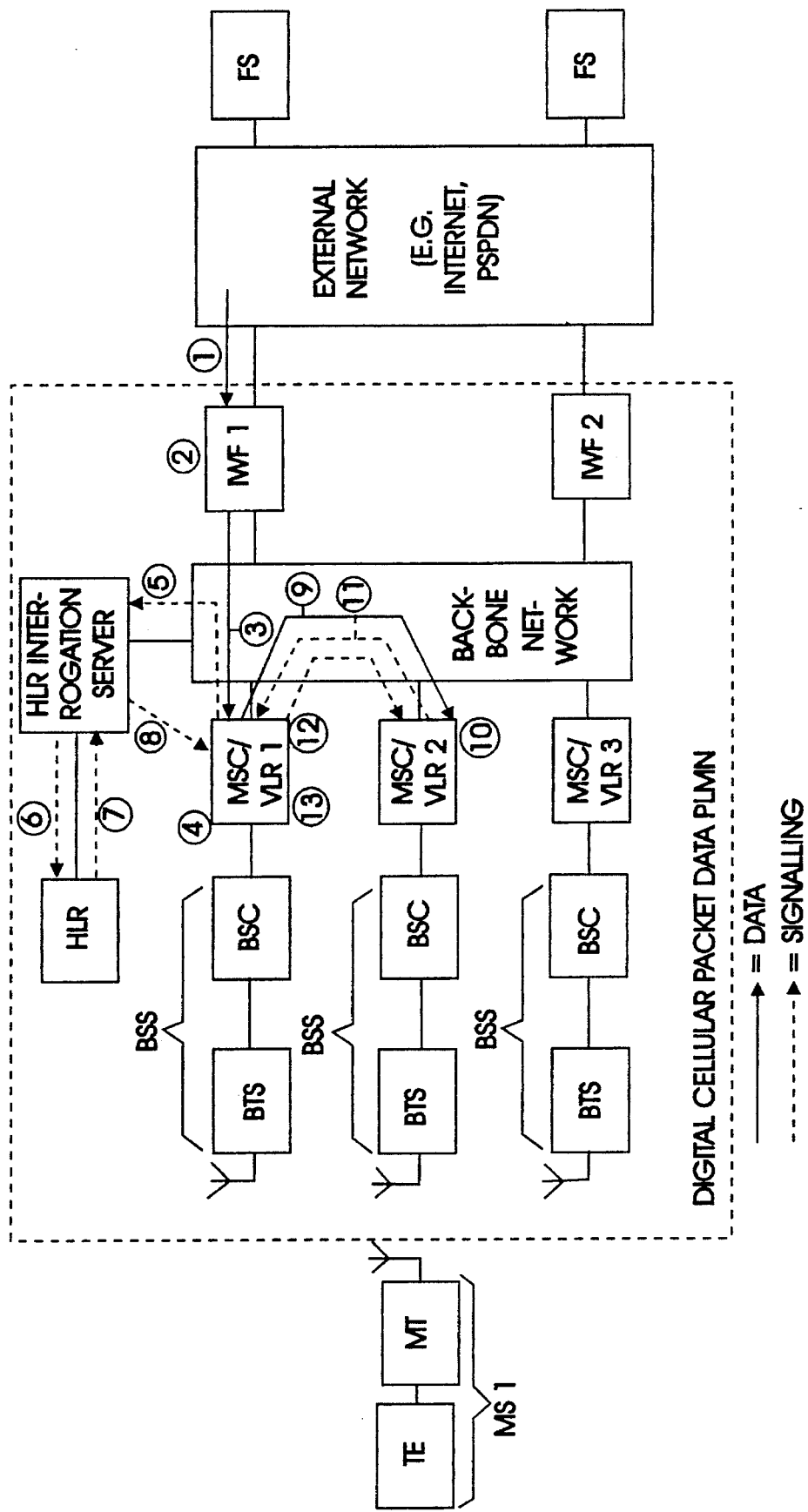
FIG. 15 illustrates an example of routing from an IWF to an MS's currently serving MSC in Embodiment I, when the addressing scheme chosen is such that an MS's IP address identifies the MS as belonging to a particular MSC.

In another possible addressing scheme, the network identifying portion of an MS's IP address identifies the MS as belonging to a specific MSC/VLR. Routing of packets in the mobile terminated direction may in this case be based on the method exemplified in FIG. 15. The sequential steps indicated in the figure are as follows:

1) IWF 1 receives a packet addressed to MS 1.
2) As required, IWF 1 performs protocol conversion and address translation in a similar way as described for the example in FIG. 14. (For an "active" MS, the address translation is performed locally.)
3) The packet is routed based on its destination address (as a normal IP packet). In this example, MS 1 is assumed to have an IP address belonging to the set of addresses assigned to MSC 1. Thus, the packet is routed to this "predetermined MSC".

If the external network is an IP network, particular IWFs may not be needed with this addressing scheme. The backbone network may then be a part of the "external network", and packets may be routed directly to the respective MSC, based on destination address.

4) The PD controller in MSC 1 determines if a route is established to MS 1's current MSC (even if, at the moment, the current MSC should be the same as the "predetermined MSC 1"). If a route is established, the sequence proceeds with 9). Otherwise, it proceeds with 5).
5)–13) In this example (as MS 1 is currently registered in MSC/VLR 2), the PD controller finds that MS 1 is not registered in MSC/VLR 1. It therefore initiates a procedure for establishing a route to MS 1's current MSC (MSC 2), in the same way as described for the example in FIG. 14. The procedure includes HLR interrogation (steps 5)–8) in the figure), and routing of an encapsulated packet to MSC 2 (step 9)).

When, with this second addressing scheme, the PD router in an MSC/VLR (MSC/VLR 1) receives a packet instead originated from an MS (MS 1) within the MSC service area, and the destination IP address is found to be within the range of addresses assigned to MSs belonging to any of the MSC/VLRs in the PLMN, the routing method may comprise the following steps:

1) The PD router determines if the destination address (the IP address of a mobile station MS 2) "belongs to" MSC/VLR 1.

If yes: Routing is then performed in the same way as described for the example in FIG. 15 (as required, including route establishment to MS 2's current MSC).

If no: The sequence proceeds with 2).

2) The PD controller checks if MS 2 is currently registered in MSC/VLR 1.

If yes: After PD mode establishment, as required, the packet is transferred to MS 2.

If no: The sequence proceeds with 3).

3) The packet is routed based on its destination address, to the "predetermined MSC" to which MS 2 belongs from an addressing point of view. Routing is then performed in the same way as described for the example in FIG. 15.

Thus, with the second addressing scheme, all packets to an MS, originating from entities outside the MS's current MSC service area, are routed via the MS's "predetermined MSC". It may therefore be advantageous to (optionally) initiate establishment of a route from the "predetermined MSC" to the MS's current MSC also when the PD router (in the MS's current MSC) receives a packet from the MS. Then, if it is found that the packet is not addressed to an MS located within the MSC service area, and that the mentioned route is not already established, the PD controller may initiate route establishment by:

Determining the IP address of the MS's "predetermined MSC", based on the network identifying portion of the (originating MS's) IP source address and stored routing information.

Initiating signalling to the "predetermined MSC" to establish the route.

In this way, HLR interrogation for any subsequent response packet (e.g. in query/response type of applications) can be avoided.

Another case, where it may be advantageous to initiate establishment of a route to an MS's current MSC based also on the MSC receiving a packet from the MS, applies to a PLMN that provides connection-oriented (X.25) network services between MSs and an external X.25 network, and that employs an addressing scheme of the first type described above. In this case, when the PD router, in an MS's current MSC, from the MS receives a packet carrying a "transport connection request" (e.g. identified by a "class of service identifier" in the frame header), the X.25 IWF to which the packet is to be routed is determined based on stored routing information. If this IWF is not already on the list of peer entities from which routes are established, linked to the MS's PD mode registration, the packet is "encapsulated" (with the IWF's IP address as destination address and the MSC's IP address as source address) and routed to the IWF. This initiates establishment of a route from the IWF to the MS's current MSC. HLR interrogation can thus be avoided for the response packet from the IWF. (In case a route is already established, the packet may be routed from the MSC to the IWF without encapsulation by merely inserting the IWF's IP address as destination address.)

I.F Mobile Station (MS)

The PD functions of a packet data MS have to a large extent, directly or indirectly, been covered in the previous sections. Therefore, this section is primarily intended to serve as a complement and summary.

A packet data MS ("PD only", or combining PD with ordinary GSM functions) comprises:

Mobile Termination (MT) which is based on current GSM MT technology, but adapted to provide the necessary PD functionality.

Terminal Equipment (TE), e.g. "laptop/palmtop" personal computer, or "Personal Digital Assistant (PDA)"/"Personal Communicator".

Subscriber Identity Module (SIM) of the same type as in ordinary GSM (but with additional parameters).

A range of MT versions providing different standard interfaces towards TE will be available, depending on market requirements. Examples include:

MT with asynchronous serial interface and PAD (Packet Assembly/Disassembly) support (e.g. AT command set PAD, X.28/X.29/X.3 PAD).

"Integrated MT" with industry standard Application Program Interfaces (APIs).

MT with synchronous serial interface (e.g. IP, X.25)

The MT comprises two main function blocks:

Terminal adapter, typically microprocessor and software based, providing the TE interface as exemplified above.

Transceiver, handling the radio interface. It is in the transceiver that most of the MS-related PD functions described in previous sections are performed, to a large extent realized with microprocessor software.

The major PD functions that the transceiver performs may be summarized as follows:

From BCCH information, identifies the degree of PDCH support provided in a cell and the MPDCH allocated (if any) for initiating packet transfer.

Handles PD mode in relation to ordinary GSM idle mode and (if applicable) call-connected mode.

Handles the PDCH protocol.

As required, requests allocation of an MPDCH on demand, using regular GSM control channels in the cell in question, or a PDCH of a currently serving adjacent cell, prior to moving into the cell in question.

Handles mobile/stationary mode of operation and sends a mode indicator at least every time the MS changes its mode of operation.

Handles normal/PD sleep paging mode and, explicitly or implicitly, sends a mode indicator at least every time the MS changes its paging mode.

Performs cell selection in PD mode based on GSM idle mode procedures but with cell selection criteria, in stationary mode and (depending on chosen realization alternative) possibly also in mobile mode, modified such that the currently selected cell is retained as long as the signal quality is above a predefined threshold value.

Performs location updating in PD mode based on regular GSM procedures.

Handles the multi-TDMA frame scheme to coordinate listening to MPDCH on one hand, and performing cell selection and listening to cell broadcast short messages on the other.

In the case of a combined MS, supporting also ordinary GSM services:

Responds to paging on MPDCH related to regular GSM calls.

Provides support for making and receiving regular GSM calls while the MS is in PD mode, maintaining PD mode as "pending" during calls.

II. EMBODIMENT 2

Figure 16:
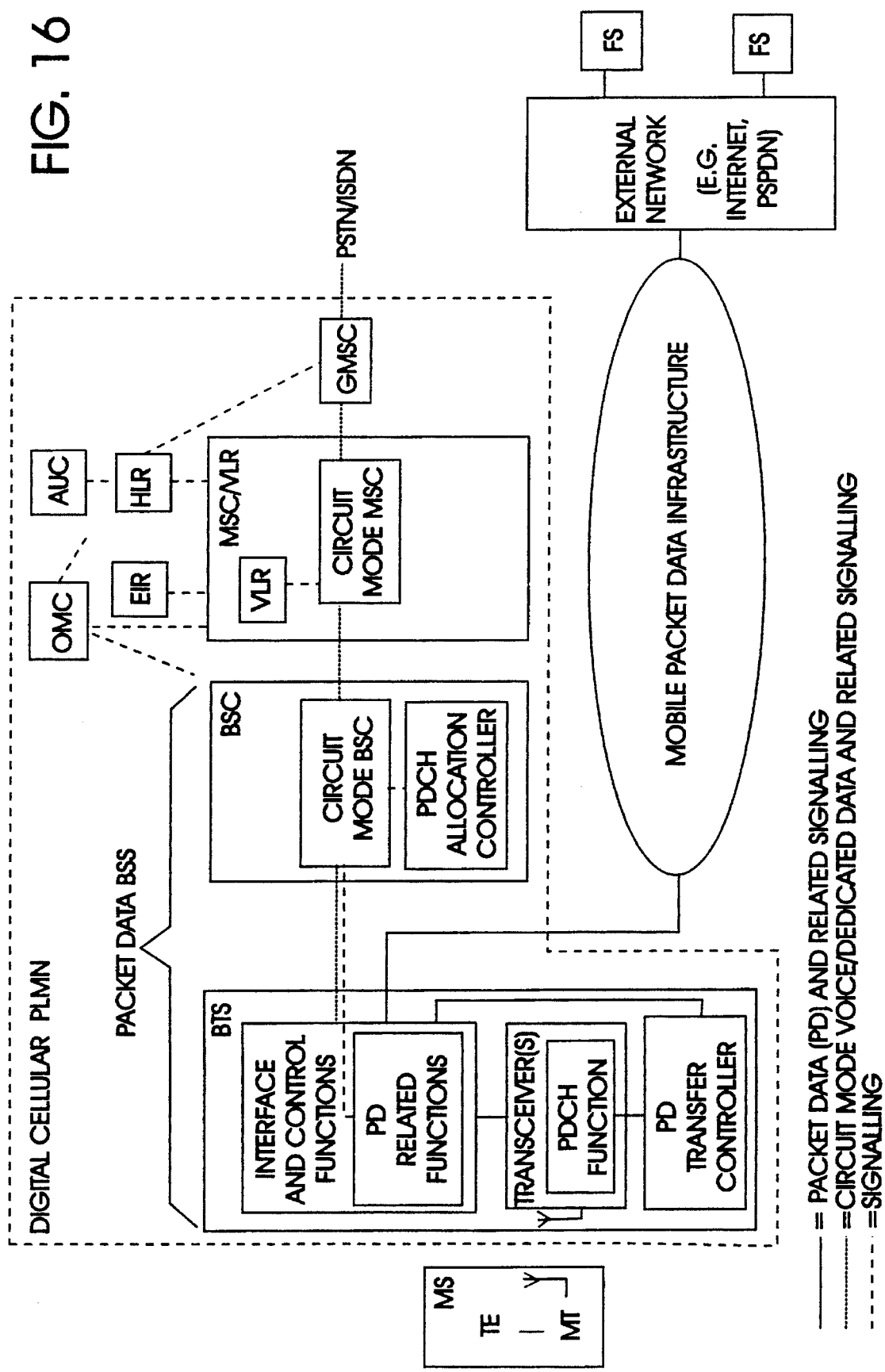
FIG. 16 illustrates an embodiment of the "separated" system concept applied to a GSM system ("Embodiment II"), by showing a block diagram of a GSM system with a Base Station System (BSS) enhanced with PD functions, the major PD function blocks shown with bold contour lines.

A schematical representation of this embodiment is shown in FIG. 16, with the major PD function blocks in the GSM system (as in FIG. 1) depicted with bold contour lines. As indicated in the figure, only the BSS portion of the GSM infrastructure is utilized for packet data. The PD functions in BTS are almost the same as in Embodiment 1, as are the PDCH allocation functions in BSC. As illustrated in the figure, the packet data transfer connection of a BTS is coupled to a separate Mobile Packet Data Infrastructure (MPDI) (instead of, as in Embodiment 1, to the PD router in MSC/VLR). The MPDI provides the necessary packet routing, mobility management, authentication, and network management functions. Together, the MPDI and the portions of BSS(s) utilized for packet data constitute a mobile packet data system. With respect to GSM, the system may be regarded as a separate system, and a GSM operator may choose to lease radio channel capacity to a separate packet data system operator. An MS requiring both packet data and regular GSM services may then need a separate subscription in each system. The packet data services provided by the system may (depending on the functionality of the MPDI) be the same as described for Embodiment 1.

In this embodiment, the only radio channels available for MSs are PDCHs and regular GSM broadcast channels. Registration, location updating (or cell location reporting), authentication and similar signalling are thus performed via PDCHs. Furthermore, allocation of the first MPDCH on user demand, using ordinary GSM signalling as in Embodiment 1, is thus not possible. With this exception, the functions for providing PDCHs are the same as described for Embodiment 1. The first MPDCH in a cell is normally allocated by system configuration, although the method (outlined for Embodiment 1) of using a PDCH of an adjacent cell for requesting allocation of an MPDCH in a "PDCH on demand cell", prior to moving into that cell, is theoretically feasible. In that case, the allocation request would be transferred to a system entity in the MPDI. This system entity would then send an allocation request to the BTS of the "PDCH on demand cell" in question which, in its turn, would convey the request to the PDCH allocation controller in BSC.

Regular GSM broadcast control channels are used in the same way as in Embodiment 1, i.e. for:

Defining PDCH support level and MPDCH allocated in the cell (via information on BCCH).

Performing cell selection as in Embodiment 1, with two alternative criteria for cell selection.

Listening to cell broadcast short messages is also (at least technically) possible in a similar way as in Embodiment 1.

Packet transfer across PDCHs may be performed according to the principles described for Embodiment 1, including using a multiframe scheme for coordinating with listening to broadcast channels, although adapted to the specific requirements of this separated system concept. The PD transfer controller and associated interface functions in BTS are also adapted to the interconnection requirements of the MPDI, e.g. to allow interconnection via a routing network.

The functions of the MS are basically the same as in Embodiment 1, except for functions related to regular GSM signalling and PD mode which are not applicable in Embodiment 2.

III. Applicability to Other TDMA Cellular Systems

While specific embodiments of the present invention applied to a GSM type of cellular system have been described, it should be understood that the present invention may be applied also to other TDMA cellular systems including D-AMPS and PDC systems. Although in these systems, BSC is not provided as a separate functional entity, corresponding base station controller functions and associated new PD functions are instead divided between MSC and base stations.

What is claimed is:

1. An apparatus for providing packet data communication to and from mobile stations in a digital TDMA cellular system having a plurality of base stations providing regular cellular control channels and regular cellular dedicated traffic channels; one or more mobile services switching centers, each being associated with a visitor location register and being coupled to a subordinated plurality of the base stations; and home location register means for storing information on mobile station subscribers, the apparatus comprising:

channel providing means for providing, in at least some of the base stations, on a per cell basis, one or more shared packet data channels for packet transfer to and from the mobile stations, and packet transfer controlling means for controlling the packet transfer;

channel defining means for defining, on a per cell basis, the packet data channel to be used for packet transfer;

first packet data mode establishing means for establishing packet data mode for a mobile station to enable the mobile station to send and receive packets over the packet data channels;

first packet transferring means for transferring packets between the mobile stations and base stations;

second packet transferring means for transferring packets between the base stations and their respective superior mobile services switching centers;

packet routing means for routing packets to and from a service area of a mobile services switching center;

first means for performing cell selection for a mobile station in packet data mode;

first means for performing location updating for the mobile station in packet data mode;

first packet data mode maintaining means for maintaining the packet data mode for a roaming mobile station; and first packet data mode terminating means for terminating the established packet data mode for the mobile station.

2. The apparatus of claim 1, wherein the channel defining means comprises first information supplying means for supplying, on a regular cellular broadcast control channel, information defining the packet data channel to be used for initiating packet transfer, if such a packet data channel is provided in the cell.

3. The apparatus of claim 2, wherein the channel defining means further comprises second information supplying means for supplying, on a regular cellular broadcast control channel, information indicating that a packet data channel for initiating packet transfer may be provided by the channel providing means on user demand.

4. The apparatus of claim 1, wherein the means for performing cell selection is adapted to perform cell selection based on regular cellular idle mode procedures.

5. The apparatus of claim 4, wherein the means for performing cell selection comprises means for retaining a currently selected cell as long as the signal quality is above a predefined threshold value.

6. The apparatus of claim 4, wherein the first packet transferring means and the first means for performing cell selection, to coordinate initiating packet transfers to mobile stations with performing cell selection in the mobile stations, comprise means for scheduling paging and other messages initiating packet transfers to mobile stations according to a multi-TDMA frame scheme synchronized with corresponding multiframe schemes used for regular cellular control channel signalling, allowing predefined times for mobile stations to perform cell selection and to receive regular cellular broadcast messages.

7. The apparatus of claim 1, wherein the first means for performing location updating is adapted to perform location updating based on regular cellular idle mode procedures.

8. The apparatus of claim 1, wherein the first packet data mode establishing means comprises:

means for initiating the establishment of packet data mode for a mobile station from an initial cellular idle mode, either by the mobile station generating a packet data service request based on regular cellular control channel signalling, or by the mobile services switching center currently serving the mobile station receiving a packet addressed to the mobile station and paging the mobile station based on regular cellular control channel signalling;

means for performing a regular cellular authentication procedure after packet data mode establishment has been initiated;

means for initiating parameters for packet encryption/decryption between the mobile station and the mobile services switching center currently serving the mobile station; and means for registering the mobile station at its current mobile services switching center with associated visitor location register as being in packet data mode.

9. The apparatus of claim 1, wherein the channel providing means comprises:

means for allocating, from a common pool of physical channels, a variable mix of packet data channels and regular cellular traffic channels determined by demand;

means for assigning a first packet data channel allocated in a cell as a channel for initiating packet transfer, capable of carrying access control signalling as well as packet data; and means for assigning a further allocated packet data channel as a channel for reserved packet transfer.

10. The apparatus of claim 9, wherein the channel providing means is adapted to allocate the first packet data channel in a cell on user demand, and comprises:

means for allocating a packet data channel as a result of a successful packet data mode establishment; and means for allocating a packet data channel based on regular cellular control channel signalling, initiated by one of a mobile station in packet data mode generating a packet data channel allocation request, or a successful paging to a mobile station in packet data mode.

11. The apparatus of claim 9, wherein the channel providing means is adapted to allocate the first packet data channel in a cell on user demand, and comprises means for allocating a packet data channel, initiated by a mobile station in packet data mode that generates a packet data channel allocation request for the cell prior to the mobile station's moving into the cell, using a packet data channel of a currently serving adjacent cell.

12. The apparatus of claim 9, wherein the channel providing means further comprises:

means for dynamically allocating a variable number of the packet data channels for initiating packet transfer such that a group of these channels can be used together with a common group of packet data channels for reserved packet transfer; and means for directing the mobile station to a particular one of the packet data channels for initiating packet transfer, if more than one such channel is allocated, based on mobile station identity and broadcast control information.

13. The apparatus of claim 1, wherein the first and second packet transferring means, for initiating a packet transfer to a mobile station in packet data mode, comprise paging means and monitoring means for monitoring a cell location of the mobile station based on a previous packet transfer, and the first and second packet transferring means are adapted for paging guided by the monitoring means to initiate a packet transfer to a mobile station.

14. The apparatus of claim 13, wherein the monitoring means comprises:

means for identifying a cell location of a mobile station originating a packet by, when the packet is received at the mobile services switching center currently serving the mobile station, associating the packet with the identity of a connection on which the packet is received, the connection being unique for each cell;

means for identifying a cell location of a mobile station responding to a paging message; and means for storing for a mobile station, linked to the mobile station's packet mode registration, at least a latest cell location identified and an associated time when the cell location was identified.

15. The apparatus of claim 13, wherein the first and second packet transferring means, for initiating a packet transfer to a mobile station, further comprise means for monitoring a mobile/stationary mode indicator sent by a mobile station capable of operating in a stationary mode to its currently serving mobile services switching center at least every time the mobile station changes from mobile mode to stationary mode and vice versa.

16. The apparatus of claim 15, wherein the first and second packet transferring means are adapted to, to a mobile station that is in stationary mode and performs cell selection based on regular cellular idle mode procedures, initiate packet transfers without previous paging or with paging in a single cell.

17. The apparatus of claim 15, wherein the first and second packet transferring means are adapted to initiate packet transfers to a mobile station that is in mobile mode and performs cell selection based on regular cellular idle mode procedures without previous paging or with paging in a single cell, provided that cell location information from the monitoring means meets predefined accuracy criteria.

18. The apparatus of claim 1, wherein the first and second packet transferring means, for initiating packet transfers to mobile stations in packet data mode, comprise paging means adapted to include a paging message type combining a paging request with reservation of an individual access slot for the mobile station to respond.

19. The apparatus of claim 1, wherein the first and second packet transferring means comprise paging means adapted to convey, on a packet data channel, paging messages related to regular cellular calls to a mobile station in packet data mode.

20. The apparatus of claim 1, wherein the first packet data mode maintaining means comprises:
   means for allowing a mobile station in packet data mode to make and receive regular cellular calls;
   means for maintaining packet data mode as pending during a regular cellular call; and
   means for returning the mobile station to active packet data mode when the regular cellular call is completed.

21. The apparatus of claim 1, wherein the packet routing means comprises:
   one or more interworking function means for internetworking with at least one external network;
   interconnection means for interconnecting the interworking function means and mobile services switching centers; and
   means for routing packets, addressed to a mobile station, from any of the interworking function means to a mobile services switching center currently serving the mobile station, the means for routing packets including:
      at the interworking function means, means for determining from stored routing information whether a route to the mobile station's currently serving mobile services switching center is established, linked to an identity of the mobile station; means for routing packets to the currently serving mobile services switching center when a route is established; and means, when a route is not established, for initially interrogating the home location register means to determine the identity of the mobile services switching center currently serving the mobile station, and for storing, linked to the identity of the mobile station, the identity of the currently serving mobile services switching center; and
      at the currently serving mobile services switching center, means for initiating establishment of packet data mode for the mobile station when packet data mode is not already established, and means for initially determining and storing, linked to a packet data mode registration of the mobile station, an identity of the interworking function means.

22. The apparatus of claim 21, wherein the packet routing means, for maintaining routes established to a mobile station's currently serving mobile services switching center when the mobile station moves to a location area belonging to a new mobile services switching center, comprises means for updating at least one of interworking function means and mobile services switching centers of any routes established about the change from the currently serving mobile services switching center to the new mobile services switching center, initiated from the new mobile services switching center, based on information provided by the first packet data mode maintaining means.

23. The apparatus of claim 21, wherein the packet routing means comprises:
   at the mobile station's currently serving mobile services switching center, means for monitoring, as to traffic activity, a route established to the currently serving mobile services switching center, linked to the packet data mode registration of the mobile station, and means for initiating termination of the route when the traffic activity falls below a predetermined level; and
   at at least one of an interworking function means and a mobile services switching center of the route, means for cancelling related routing information when termination of the route is initiated.

24. The apparatus of claim 1, wherein the packet routing means comprises:
   interconnection means for interconnecting mobile services switching centers; and
   means for routing packets originated from a first mobile station and addressed to a second mobile station, including:
      at the mobile services switching center currently serving the first mobile station, means for determining from stored routing information whether a route to the mobile services switching center currently serving the second mobile station is established, linked to a packet data mode registration of the first mobile station; means for routing packets to the second mobile station's currently serving mobile services switching center when a route is established; and means for initially interrogating the home location register means to determine an identity of the mobile services switching center currently serving the second mobile station when a route is not established, and for storing, as routing information, the identity of the second mobile station's currently serving switching center with the identity of the second mobile station, linked to the packet data mode registration of the first mobile station; and
      at the mobile services switching center currently serving the second mobile station, means for initiating establishment of packet data mode for the second mobile station when packet data mode is not already established, and means for initially determining and storing, linked to the packet data mode registration of the second mobile station, an identity of the first mobile station and an identity of the mobile services switching center currently serving the first mobile station.

25. The apparatus of claim 1, wherein the packet routing means comprises:
   interconnection means for interconnecting mobile services switching centers, and for connecting one or more mobile services switching centers to at least one external network;
   means for routing packets addressed to a mobile station from an external network or another mobile station to an addressed mobile services switching center to which the mobile station belongs for packets addressed to the mobile station; and
   means for routing packets addressed to a mobile station from the addressed mobile services switching center to a mobile services switching center currently serving the mobile station, including:

at the addressed mobile services switching center, means for determining from stored routing information whether a route to the mobile station's currently serving mobile services switching center is established, linked to an identity of the mobile station; means for routing packets to the currently serving mobile services switching center when a route is established; and means for initially interrogating the home location register means, when a route is not established, to determine an identity of the currently serving mobile services switching center, and for storing, as routing information, the identity of the currently serving mobile services switching center linked to the identity of the mobile station; and at the currently serving mobile services switching center, means for initiating establishment of packet data mode for the mobile station when packet data mode is not already established, and means for initially determining and storing, linked to the packet data mode registration of the mobile station, an identity of the addressed mobile services switching center.

26. The apparatus of claim 1, wherein the first packet data mode maintaining means, for maintaining packet data mode for a mobile station when the mobile station moves to a location area belonging to a new mobile services switching center, comprises means for transferring a packet data mode registration and associated information, stored at the mobile station's currently serving mobile services switching center, from the currently serving mobile services switching center to the new mobile services switching center, initiated from the new mobile services switching center, based on information provided by the means for performing location updating.

27. The apparatus of claim 1, wherein the first packet data mode terminating means comprises means for monitoring a mobile station as to traffic activity, and means for terminating packet data mode and a route established to the mobile station's currently serving mobile services switching center when the traffic activity falls below a predetermined level.

28. The apparatus of claim 1, wherein the first packet data mode terminating means comprises means for monitoring a time elapsed since packet data mode was established for a mobile station, and means for terminating packet data mode and an associated route established to the mobile station's currently serving mobile service's switching center when the time elapsed exceeds a predetermined period of time.

29. A mobile station for packet data communication over digital TDMA cellular shared packet data channels provided by the apparatus according to claim 1, comprising:

channel identifying means for identifying, on a per cell basis, the packet data channel to be used for initiating packet transfer;

second packet data mode establishing means for establishing packet data mode for the mobile station to enable the mobile station to send and receive packets over the packet data channels;

means for sending and receiving packets over the packet data channels;

second means for performing cell selection in packet data mode;

second means for performing location updating in packet data mode;

second packet data mode maintaining means for maintaining the packet data mode for the mobile station; and second packet data mode terminating means for terminating the established packet data mode for the mobile station.

30. The mobile station of claim 29, wherein the channel identifying means is adapted to read, from a regular cellular broadcast control channel, information supplied for defining a packet data channel to be used for initiating packet transfer.

31. The mobile station of claim 30, wherein the channel identifying means is adapted to read, from a regular cellular broadcast control channel, information supplied for indicating that the packet data channel for initiating packet transfer may be provided on user demand.

32. The mobile station of claim 29, wherein the second means for performing cell selection is adapted to perform cell selection based on regular cellular idle mode procedures.

33. The mobile station of claim 32, wherein the second means for performing cell selection comprises means for retaining a currently selected cell as long as the signal quality is above a predefined threshold value.

34. The mobile station of claim 32, wherein the means for sending and receiving packets and the second means for performing cell selection, to coordinate listening to a packet data channel on which packet transfers to the mobile station are initiated with performing cell selection, comprise means for scheduling listening for paging and other messages initiating packet transfers to the mobile station according to a multi-TDMA frame scheme synchronized with corresponding multiframe schemes used for regular cellular control channel signalling allowing predefined times for the mobile station to perform cell selection and to receive regular cellular broadcast messages.

35. The mobile station of claim 29, wherein the second means for performing location updating is adapted to perform location updating based on regular cellular idle mode procedures.

36. The mobile station of claim 29, wherein the second packet data mode establishing means comprises:

means for initiating establishment of packet data mode in the mobile station, from an initial cellular idle mode, by one of the mobile station's generating a packet data service request based on regular cellular control channel signalling, or the mobile stations receiving a paging message based on regular cellular control channel signalling, indicating that a packet, addressed to the mobile station, has been received by a mobile services switching center currently serving the mobile station;

means for performing a regular cellular authentication procedure after packet data mode establishment has been initiated;

means for initiating parameters for packet encryption/decryption in the mobile station; and means for storing, for the mobile station, information indicating that packet data mode is established.

37. The mobile station of claim 29, further comprising means, when the mobile station is in packet data mode and is located in a cell providing a packet data channel on user demand, for generating a packet data channel allocation request based on regular cellular control channel signalling.

38. The mobile station of claim 29, further comprising means, when the mobile station is in packet data mode and is located in a currently serving cell with a packet data channel allocated, for generating a packet data channel allocation request for an adjacent cell providing packet data channel on user demand, prior to moving into the adjacent cell, using a packet data channel of the currently serving cell.

39. The mobile station of claim 29, wherein the means for sending and receiving packets comprises means for sending a mobile/stationary mode indicator to a mobile services switching center currently serving the mobile station at least every time the mobile station changes from mobile mode to stationary mode and vice versa.

40. The mobile station of claim 29, wherein the means for sending and receiving packets comprises means for responding to a paging message type combining a paging request with reservation of an individual access slot for the mobile station to respond.

41. The mobile station of claim 29, wherein the means for sending and receiving packets comprises means for responding to a paging message received on a packet data channel and related to a regular cellular call.

42. The mobile station of claim 29, wherein the second packet data mode maintaining means comprises means for allowing the mobile station to make and receive regular cellular calls when being in packet data mode;

means for maintaining packet data mode as pending during a regular cellular call; and means for returning the mobile station to active packet data mode when the regular cellular call is completed.

43. An apparatus for providing packet data communication to and from mobile stations, utilizing a plurality of base stations of a digital TDMA cellular system that provide regular cellular control channels and regular cellular dedicated traffic channels, comprising:

channel providing means for providing, in at least some of the base stations, one or more shared packet data channels for packet transfer to and from the mobile stations, and packet transfer controlling means for controlling the packet transfer;

channel defining means for defining, on a per cell basis, the packet data channel to be used for packet transfer;

packet transferring means for transferring packets between mobile stations and base stations;

coupling means for coupling the packet transfer controlling means to a separate mobile packet data infrastructure comprising packet routing means, for routing packets to and from a service area of a mobile switching center, and mobility management means, for managing location and routing information for the mobile stations; and first means for performing cell selection for the mobile stations.

44. The apparatus of claim 43, wherein the channel defining means comprises information supplying means for supplying, on a regular cellular broadcast control channel, information defining the packet data channel to be used for initiating packet transfer, if such a packet data channel is provided in the cell.

45. The apparatus of claim 43, wherein the first means for performing cell selection is adapted to perform cell selection based on regular cellular idle mode procedures.

46. The apparatus of claim 45, wherein the first means for performing cell selection comprises means for retaining a currently selected cell as long as the signal quality is above a predefined threshold value.

47. The apparatus of claim 43, wherein the channel providing means comprises:

means for allocating, from a common pool of physical channels, a variable mix of packet data channels and regular cellular traffic channels determined by demand;

means for assigning a first packet data channel allocated in a cell as the channel for initiating packet transfer, capable of carrying access control signals and packet data; and means for assigning a further allocated packet data channel as a channel for reserved packet transfer.

48. The apparatus of claim 47, wherein the channel providing means comprises:

means for dynamically allocating a variable number of the packet data channels for initiating packet transfer such that a group of these channels can be used together with a common group of packet data channels for reserved packet transfer; and means for directing a mobile station to a particular one of the packet data channels for initiating packet transfer, if more than one such channel is allocated, based on an identity of the mobile station and on broadcast control information.

49. The apparatus of claim 43, wherein the packet transferring means, for initiating packet transfers to mobile stations, comprises paging means adapted to include a paging message type combining a paging request with reservation of an individual access slot for the mobile station to respond.

50. The apparatus of claim 43, wherein the packet transferring means and the first means for performing cell selection, to coordinate initiating packet transfers to mobile stations with performing cell selection in the mobile stations, comprise means for scheduling messages initiating packet transfers to mobile stations according to a multi-TDMA frame scheme synchronized with corresponding multiframe schemes used for regular cellular control channel signalling, allowing predefined times for mobile stations to perform cell selection and to receive regular cellular broadcast messages.

51. A mobile station for packet data communication over digital TDMA cellular shared packet data channels provided by the apparatus of claim 43, comprising:

channel identifying means for identifying, on a per cell basis, the packet data channel to be used for initiating packet transfer;

means for sending and receiving packets over the packet data channels; and second means for performing cell selection.

52. The mobile station of claim 51, wherein the channel identifying means is adapted to read, from a regular cellular broadcast control channel, information supplied for defining a packet data channel to be used for initiating packet transfer.

53. The mobile station of claim 51, wherein the means for sending and receiving packets comprises means for sending a mobile/stationary mode indicator to the separate mobile packet data infrastructure at least every time the mobile station changes from mobile mode to stationary mode and vice versa.

54. The mobile station of claim 51, wherein the means for sending and receiving packets comprises means for responding to a paging message type combining a paging request with a reservation of an individual access slot for the mobile station to respond.

55. The mobile station of claim 51, wherein the second means for performing cell selection is adapted to perform cell selection based on regular cellular idle mode procedures.

56. The mobile station of claim 55, wherein the second means for performing cell selection comprises means for retaining a currently selected cell as long as the signal quality is above a predefined threshold value.

57. The mobile station of claim 55, wherein the means for sending and receiving packets and the second means for performing cell selection, to coordinate listening to the packet data channel on which packet transfers to the mobile station are initiated with performing cell selection, comprise means for scheduling listening for messages initiating packet transfers to the mobile station according to a multi-TDMA frame scheme synchronized with corresponding multiframe schemes used for regular cellular control channel signalling, allowing predefined times for the mobile station to perform cell selection and to receive regular cellular broadcast messages.

* * * * *